(12) United States Patent
Kitayoshi et al.

(10) Patent No.: US 8,179,263 B2
(45) Date of Patent: May 15, 2012

(54) RF ID TAG DEVICE

(75) Inventors: Hitoshi Kitayoshi, Sendai (JP); Kunio Sawaya, Sendai (JP)

(73) Assignee: Intelligent Cosmos Research Institute, Miyagi (JP)

( * ) Notice: Subject to any disclaimer, the term of this patent is extended or adjusted under 35 U.S.C. 154(b) by 1126 days.

(21) Appl. No.: 10/590,882

(22) PCT Filed: Feb. 21, 2005

(86) PCT No.: PCT/JP2005/002746
§ 371 (c)(1),
(2), (4) Date: Feb. 13, 2008

(87) PCT Pub. No.: WO2005/083895
PCT Pub. Date: Sep. 9, 2005

(65) Prior Publication Data
US 2009/0033462 A1    Feb. 5, 2009

(30) Foreign Application Priority Data

Feb. 27, 2004 (JP) ................................. 2004-054933
Oct. 19, 2004 (JP) ................................. 2004-304876

(51) Int. Cl.
*G08B 13/14* (2006.01)
(52) U.S. Cl. ................................. 340/572.7; 340/10.3
(58) Field of Classification Search .................. 340/10.1, 340/10.3, 572.7; 343/795
See application file for complete search history.

(56) References Cited

U.S. PATENT DOCUMENTS

| | | | | |
|---|---|---|---|---|
| 3,761,934 A * | 9/1973 | Terakawa | ...................... | 343/752 |
| 4,159,470 A * | 6/1979 | Strojny et al. | .................. | 714/4.4 |
| 4,537,515 A * | 8/1985 | Dinger et al. | ................. | 368/202 |
| 4,942,393 A * | 7/1990 | Waraksa et al. | .............. | 340/5.62 |
| 5,572,190 A * | 11/1996 | Ross et al. | ..................... | 340/541 |
| 5,726,630 A * | 3/1998 | Marsh et al. | ................. | 340/10.2 |
| 5,777,561 A * | 7/1998 | Chieu et al. | ................. | 340/10.32 |
| 5,826,175 A * | 10/1998 | Schmidt et al. | ................. | 455/77 |
| 5,986,570 A * | 11/1999 | Black et al. | ................. | 340/10.2 |
| 5,995,019 A * | 11/1999 | Chieu et al. | ................. | 340/10.32 |
| 6,137,422 A * | 10/2000 | Hahn et al. | .................... | 340/10.1 |
| 6,150,921 A * | 11/2000 | Werb et al. | .................... | 340/10.1 |
| 6,236,314 B1 * | 5/2001 | Smith et al. | ................. | 340/572.7 |
| 6,466,131 B1 * | 10/2002 | Tuttle et al. | ................. | 340/572.7 |
| 6,661,336 B1 * | 12/2003 | Atkins et al. | ................. | 340/10.2 |
| 6,784,787 B1 * | 8/2004 | Atkins et al. | ................. | 340/10.4 |
| 6,942,155 B1 * | 9/2005 | Stewart et al. | ................. | 235/487 |

(Continued)

FOREIGN PATENT DOCUMENTS

JP    11-261339    9/1999

(Continued)

*Primary Examiner* — Daniel Wu
*Assistant Examiner* — Rufus Point
(74) *Attorney, Agent, or Firm* — Young & Thompson

(57) ABSTRACT

The present invention aims to overcome the drawback with conventional RFID tag devices having a short communication range, and expand the communication range to several times or more that in the conventional scheme. The conventional scheme is based on equilibrium feeding/equilibrium modulation (a two-terminal circuit for antenna operation), whereas the present invention is based on disequilibrium feeding/equilibrium modulation (a three-terminal circuit for antenna operation). The conventional scheme is based on simple rectification of received RF signals, whereas the present invention employs a circuit based on a combination of a stub resonance-based, impedance transformation boosting scheme and a ladder boosting scheme. The conventional scheme is based on ASK or BPSK modulation, whereas the present invention is based on passive modulation, but can employ a QPSK modulation circuit.

21 Claims, 30 Drawing Sheets

PRESENT INVENTION

U.S. PATENT DOCUMENTS

| | | | |
|---|---|---|---|
| 7,006,014 B1 * | 2/2006 | Henty | 341/22 |
| 7,084,769 B2 * | 8/2006 | Bauer et al. | 340/572.7 |
| 7,151,436 B2 * | 12/2006 | Fischer et al. | 340/10.1 |
| RE40,111 E * | 2/2008 | Sanderford et al. | 375/141 |
| 7,339,481 B2 * | 3/2008 | Duron | 340/572.7 |
| 7,408,456 B2 * | 8/2008 | Whitesmith et al. | 340/500 |
| 7,612,652 B2 * | 11/2009 | Stewart et al. | 340/10.34 |
| 7,616,113 B2 * | 11/2009 | Ayachitula et al. | 340/539.13 |
| 7,741,956 B1 * | 6/2010 | Nysen | 340/10.41 |
| 2006/0132302 A1 * | 6/2006 | Stilp | 340/539.22 |

FOREIGN PATENT DOCUMENTS

JP  2003-69447  3/2003

* cited by examiner

PRESENT INVENTION

FIG.29

```
real*4 ep(5),x(5),y(5),z(5),xs(5),ys(5),zs(5)
real*4 al(200),bl(200),cl(201)

iij=1234556
f0=0.05
dlh=15.0/f0      ! cm        ](1)
na=16
write(*,10)
format(' Enter the location of x,y,z (cm) : '$)   (2)
read(*,*,end=90) xp,yp,zp call marray(xp,yp,zp,na,cl)   (3)
do i=2,na+1
    verr=ran(iij)
    al(i-1)=cl(i)*(1.0+(verr-0.5)*0.001)-cl(1)   ! noise 0.1 %   ](4)
end do
write(*,*)   ⊿L(cm)', (al(i),i=1,na)
write(*,*)

call mcycle(na,dlh,al)   (5)

do i=1,5
    ep(i)=1.0e20
end do do ix=-30,30
    xp=float(ix)*10.0
    do iy=-30,30                    ](6)
        yp=float(iy)*10.0
        do iz=-30,30
            zp=float(iz)*10.0 call marray(xp,yp,zp,na,cl)   (7)
            do i=2,na+1
                bl(i-1)=cl(i)-cl(1)-al(i-1)   (8)
            end do call mcycle(na,dlh,bl)   (9)
            er=0.0
            do i=1,na
                er=er+bl(i)**2   (10)
            end do
            do i=1,5
                if (er .lt. ep(i)) then
                    if (i .ne. 5) then
                        do j=5,i+1,-1
                            ep(j)=ep(j-1)
                            x(j)=x(j-1)
                            y(j)=y(j-1)
                            z(j)=z(j-1)           ](11)
                        end do
                    end if
                        ep(i)=er
                        x(i)=xp
                        y(i)=yp
                        z(i)=zp
                        go to 30
```

FIG.30

```
                    end if
                end do
                continue
            end do
        end do
end do do i=1,5
    xs(i)=x(i)
    ys(i)=y(i)
    zs(i)=z(i)
end do write(*,*) ' RMS error (cm)          x               y               z    (12)
do i=1,5
    write(*,*) sqrt(ep(i)/float(na)),x(i),y(i),z(i)
end do do m=1,5                                                                  (13)
    x0=xs(m)
    y0=ys(m)
    z0=zs(m)
do ix=-15,15
    xp=float(ix)+x0
    do iy=-15,15
        yp=float(iy)+y0
        do iz=-15,15
            zp=float(iz)+z0 call marray(xp,yp,zp,na,cl)
            do i=2,na+1
                bl(i-1)=cl(i)-cl(1)-al(i-1)
            end do call mcycle(na,dlh,bl)
            er=0.0
            do i=1,na
                er=er+bl(i)**2
            end do do i=1,5
                if (er .lt. ep(i)) then
                    if (i .ne. 5) then
                        do j=5,i+1,-1
                            ep(j)=ep(j-1)
                            x(j)=x(j-1)
                            y(j)=y(j-1)
                            z(j)=z(j-1)
                        end do
                    end if
                    ep(i)=er
                    x(i)=xp
                    y(i)=yp
                    z(i)=zp
                    go to 35
                end if
            end do
```

FIG.31

```
                continue
            end do
        end do
    end do end do
    write(*,*)
    write(*,*) sqrt(ep(1)/float(na)),x(1),y(1),z(1)    (14)

write(*,*)
    go to 20 stop
    end subroutine marray(xp,yp,zp,na,cl)

real*4 cl(1)

cl(1)=sqrt(xp*xp+yp*yp+(zp+50.0)**2)
    do i=2,na+1
        ixx=i/3
        iyy=i-ixx*3
        xm=float(ixx-1)*50.0-10.0
        ym=float(iyy-1)*50.0+10.0
        cl(i)=sqrt((xp-xm)**2+(yp-ym)**2+zp*zp)
    end do return
    end subroutine mcycle(na,dlh,al)

real*4 al(1)

do i=1,na
        continue
        if (al(i) .gt. dlh) then
            al(i)=al(i)-dlh
            if (al(i) .le. dlh) go to 46
            go to 40
        end if
        continue
        if (al(i) .lt. -dlh) then
            al(i)=al(i)+dlh
            if (al(i) .ge. -dlh) go to 46
            go to 45
        end if
        continue
    end do return
    end
```

FIG.32

```
Enter the location of x,y,z (cm) : 152,-203,56
 ⌀L(cm)   67.67562      -38.21133      -1.487458      39.09471
-69.24731        -27.88023       16.30007      -91.74537      -46.11990
  0.9732714      -102.0754       -54.30361      -5.570741     -98.28325
-51.46763        -3.269386

RMS error (cm)       x              y              z
 0.6834297       150.0000       -200.0000        60.00000
 0.8562734       150.0000       -190.0000        50.00000
 1.116775        150.0000       -200.0000        50.00000
 1.163736        160.0000       -230.0000        70.00000
 1.216863        160.0000       -220.0000        60.00000

8.4395386E-02   152.0000       -203.0000        56.00000

Enter the location of x,y,z (cm) : 22,123,-89
 ⌀L(cm)    5.506481      57.46710       16.50204      -17.27929
 55.74849        14.06553       -20.41722       66.89948       28.19106
 -2.332703       89.04320        55.22502       29.83902      119.4193
 90.37129        69.39222

RMS error (cm)       x              y              z
 1.445567         20.00000      130.0000       -90.00000
 1.754374         20.00000      130.0000      -100.0000
 1.951296         20.00000      120.0000       -80.00000
 2.345274         20.00000      120.0000       -90.00000
 2.709345         20.00000      140.0000      -100.0000

6.2024966E-02    22.00000      123.0000       -89.00000

Enter the location of x,y,z (cm) : 60,161,5
 ⌀L(cm)   -23.45399      32.54938      -13.85323      -57.41031
 21.66080        -27.96993      -77.36571       22.85288      -26.38201
-74.96463         36.05470      -9.367880      -51.50449       59.00156
 18.86572        -15.62937

RMS error (cm)       x              y              z
 1.358104         60.00000      160.0000       10.00000
 1.400364         60.00000      160.0000        0.0000000E+00
 1.561480         60.00000      170.0000        0.0000000E+00
 1.779230         60.00000      170.0000       10.00000
 1.850774         60.00000      150.0000       10.00000

4.4650473E-02    60.00000      161.0000        5.000000

Enter the location of x,y,z (cm)
```

RF ID TAG DEVICE

TECHNICAL FIELD

The present invention relates to RFID tag devices and position detection and communication methods using the same, and specifically to an RFID tag device based on passive modulation, but capable of performing, for example, QPSK modulation for wireless communication by using a loop antenna or a dipole antenna, and position detection and communication methods using the same.

BACKGROUND ART

Patent Document 1: Japanese Laid-Open Patent Publication No. 10-224262
(Tags for Radio Frequency Identification Communication Systems)

RFID is wireless equipment for identifying mobile objects, which is attached to or held by a commodity, a person, a car, a road sign, etc., and in response to a radio wave from an interrogator (a reader/writer), notifies individual information and position information to the interrogator.

The RFID is considered not only as an alternative to the barcode, but also as elemental technology for implementing an entirely new infrastructure for a future network community. The research and development of RFID currently underway mainly concentrates on communication within a relatively short range of several tens of centimeters, but if it is possible to realize low-cost small RFID tags capable of communication from relatively afar, such as from about 10 meters away, the application range will be conceivably further extended.

When such is attached to a commodity, a person, a car or a road sign, for example, its individual information and position information are read by a mobile object from 10 m away, making it possible to readily enjoy safety and convenience.

The above Patent Document 1 describes a conventional passive RFID tag device. According to this, the conventional passive RFID tag device is basically configured as shown in FIG. 1, and therefore has a problem that its possible communication range is short for the following reasons.

(1) A response signal is created by frequently changing impedance $Z_v$ between antenna feeding points (1) and (2) to repeat reflection and absorption of incident radio waves, so that the transmission output (conversion efficiency) is low, and the load impedance $Z_v$ is applied between the feeding points (1) and (2), resulting in considerable loss of received power.

(2) The source voltage for a control circuit is created by directly diode-rectifying an RF signal received between the antenna feeding points (1) and (2), and therefore the output voltage is low.

(3) ASK or BPSK is used as a subcarrier modulation method, and therefore the amount of information that can be transmitted per transmission power is small.

DISCLOSURE OF INVENTION

Problem to be Solved by the Invention

The present invention aims to overcome the drawback with the above conventional technology by the configuration shown in FIG. 2, and expand the communication range to several times or more that in the conventional method.

Means for Solving Problem

The main points of the present invention for solving the above problems are as shown below.

The conventional method is based on equilibrium feeding/equilibrium system modulation (a two-terminal circuit for antenna operation), whereas a method of the present invention is based on disequilibrium feeding/equilibrium system modulation (a three-terminal circuit for antenna operation). The conventional method is based on simple rectification of received RF signals, whereas the present invention employs a circuit based on a combination of a stub resonance-based, impedance transformation boosting scheme and a ladder boosting scheme. The conventional method is based on ASK or BPSK modulation, whereas the present invention is based on passive modulation, but can employ a QPSK modulation circuit. The equilibrium feeding means balanced feeding, the disequilibrium feeding means unbalanced feeding, and the equilibrium system modulation means an impedance modulation system of balanced load.

Specifically, an RFID tag device of the present invention includes a divided microstrip antenna having a GND plate 5 (a ground plane conductor), a power receiving circuit based on a combination of a stub resonance-based, impedance transformation RF boosting scheme and a ladder boosting/rectifying scheme, and a local oscillator circuit for generating a response subcarrier signal, and a dividing position (3)-(4) of the divided microstrip antenna is slightly deviated from a longitudinal center point across strip conductors. In the present invention, a passive QPSK modulation scheme can be used as a modulation method.

Also, according to the RFID tag device of the present invention, it is preferred that impedance modulation elements $Z_v$ of the divided microstrip antenna are respectively connected to opposite ends of strip conductors 3 and 4 in the width direction so as to connect divided conductors. The impedance modulation elements $Z_v$ constitute an equilibrium system modulation circuit.

The impedance modulation elements are preferably PIN diodes or varactor diodes. Also, a voltage or current controlled three-terminal element using a transistor, rather than a diode, is preferable.

Further, according to the RFID tag device of the present invention, an extremely small capacitance (1 pF/GHz or less) is preferably used for connecting the power receiving circuit and an antenna feeding point (3) to perform high-impedance capacitive feeding. As a result, disequilibrium feeding is performed. Note that in order to maximize the receiving efficiency of the antenna, the antenna feeding point (3) may be positioned so as not to correspond to a dividing point of the divided microstrip antenna.

Also, according to the RFID tag device of the present invention, it is preferred that capacitive load impedances in a stub resonator and a ladder boost rectifier circuit of the power receiving circuit are parallel resonant, and further, the capacitive feeding impedance are series resonant.

Further, according to the RFID tag device of the present invention, it is preferred that when considering longitudinal connections of capacitors in the ladder boost rectifier circuit of the power receiving circuit as GND- and receiving-side rails, capacitor capacitance of the receiving-side rail is smaller than that of the GND-side rail, a first diode between GND and a receiving point is eliminated, and a high-frequency and high-impedance input is receivable by a DC short.

Also, according to the RFID tag device of the present invention, a logic circuit including a ¼ frequency divider, a shift register and a data selector is preferably used in the passive QPSK modulation method, and MPSK modulation is preferably applied by using a 1/M frequency divider, an M-stage shift register and an M-input data selector.

Further, according to the RFID tag device of the present invention, information is preferably recorded to a memory in units of two bits in accordance with the passive QPSK modulation method.

Also, the RFID tag device of the present invention preferably includes an timing generator circuit for obtaining an output enable signal in the passive QPSK modulation method, and the output timing generator circuit preferably generates a train of pulses with a random delay time having a fixed width and a fixed frame cycle, based on a source voltage size and a clock signal.

According to the RFID tag device of the present invention, it is preferred that by using a transducer such as a temperature sensor quartz resonator as the local oscillator circuit for generating the response subcarrier signal, a sensor function capable of allowing its oscillating frequency to be read by an external unit is additionally used.

According to a position detecting method for a mobile object having no RFID tag of the present invention, in a system composed of the RFID device and one or more master devices (interrogators), whether or not an obstacle is present in a radio wave propagation path extending between each RFID tag device and each interrogator is determined based on the presence or absence of communication between the RFID tag and the interrogator.

In the position detecting method for a mobile object having no RFID tag, a plurality of radio wave propagation paths present between each RFID tag and each interrogator are preferably distinguished based on a combination of a local oscillating frequency for generating a response subcarrier of each RFID tag, a response timing and a frequency of an interrogation radio wave outputted from the interrogator and timing of generating the interrogation radio wave.

According to a position detecting method for a mobile object having an RFID tag of the present invention, radio waves at two or more frequencies are transmitted to an RFID tag device from an interrogator having two or more antennas dedicated for reception or used for transmission and reception, and based on a difference in delay time obtained from a difference in phase between receiving antennas in a signal for response thereto, maximum likelihood determination of a position of the RFID tag is performed.

According to the position detecting method for a mobile object having an RFID tag, in the case where in order to enable a three-dimensional RFID tag position determination, an interrogation device having four or more antennas dedicated for reception or used for transmission and reception is used, it is preferred to eliminate a commonly measured distance offset by obtaining a group delay time in each radio wave propagation path based on four or more sets of frequency responses measured for the two or more frequencies, and obtaining a difference in delay time with reference to at least one of the sets.

It is preferred that the RFID tag device of the present invention includes two or more tag antennas in order to expand its possible communication range.

According to a communication method of the present invention, the RFID tag device periodically changes directionality of an intense response subcarrier radio wave, which is synthesized by periodically changing a phase of a local oscillating signal provided to each tag antenna for generating a response subcarrier signal, thereby returning an intense response radio wave toward an interrogator in a wide area.

Effect of the Invention

By employing these configurations, it is made possible to achieve considerable effects as below.

Disequilibrium feeding and equilibrium system modulation (a three-terminal circuit for antenna operation) are employed, and therefore it is possible to achieve the effect of maximizing the reception efficiency of an antenna.

Also, by employing a circuit based on a combination of a stub resonance-based, impedance transformation boosting scheme and a ladder boosting scheme, it is possible to obtain a reception voltage of five times or more that of conventional schemes.

Further, by employing a QPSK modulation circuit, but based on passive modulation, it is made possible to transmit information in an amount twice that of the conventional method per unit of transmitting power.

BRIEF DESCRIPTION OF DRAWINGS

FIG. 29 is an example program of FORTRAN for estimating the three-dimensional location of an RFID tag;

FIG. 30 is an example program of FORTRAN for estimating the three-dimensional location of an RFID tag;

FIG. 31 is an example program of FORTRAN for estimating the three-dimensional location of an RFID tag; and FIG. 32 is an execution example of a FORTRAN program for estimating the three-dimensional location of an RFID tag.

Figure 1:
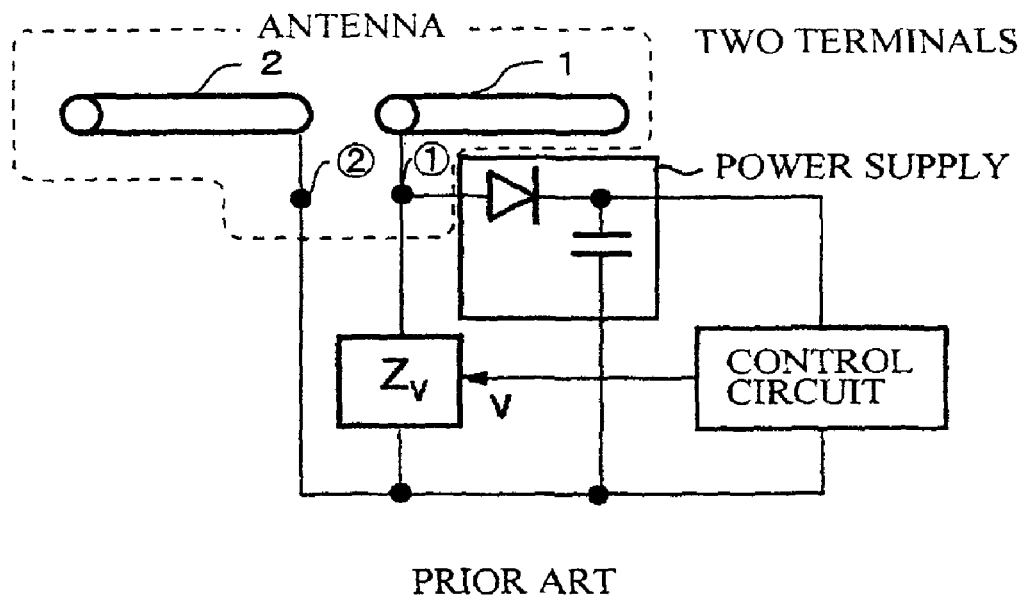
FIG. 1 is a schematic diagram illustrating a conventional RFID tag device.

EXPLANATIONS OF LETTERS OR NUMERALS 1 one of two elements of a conventional dipole antenna for RFID.
2 the other one of two elements of the conventional dipole antenna for RFID.
3 one of two element strip conductor of a divided microstrip antenna for RFID according to an example of the present invention.
4 the other one of two element strip conductor of the divided microstrip antenna for RFID according to an example of the present invention.
5 GND plate of the divided microstrip antenna for RFID according to an example of the present invention.
(1) feeding point of the conventional dipole antenna for RFID.
(2) another feeding point of the conventional dipole antenna for RFID.
(3) feeding point of the divided microstrip antenna for RFID according to an example of the present invention.
(4) dividing position of the divided microstrip antenna for RFID according to an example of the present invention.

(5) GND point of the divided microstrip antenna for RFID according to an example of the present invention.

c1201 In the case of single reading (packets cannot be multiplexed at the same time), semi-synchronous delay detection is performed.

c1202 In the case of double reading (two packets can be multiplexed at the same time), carrier phase split synchronous detection is performed.

c1203 A received carrier is modulated and ID codes are transmitted in packets.

c1204 tmn is determined for each RFID by generating random numbers c1401, c2401, c2601 A receiver signal level of $f_0+f_{LO}$ is read.

c2201 Synchronous detection of $\omega_n+\Delta$ is performed for each antenna reception signal.

c2202 A three-dimensional location is estimated based on at least three parameters; in practice, a reflected wave is present, and therefore time-delay measurements are performed using the MUSIC algorithm based on differences between multi-frequency response phases.

c2801 1 and 0 represent a phase difference of 180°.

c2802 High sensitivity is realized in a wide range by successively switching between modulation phases.

c2803 Modulation phase of each element

D1, D2, D3, D4, D5, D6 Schottky-barrier diode

D7, D8 PIN diode

D9 Zener diode

BEST MODES FOR CARRYING OUT THE INVENTION

An embodiment of the present invention will now be described.

In the present invention, the dividing position of a divided microstrip antenna is slightly deviated from the longitudinal center point across strip conductors.

Now, assuming that the center point lies at the 50% position with respect to the length of the strip conductor, the dividing position is preferably 55% to 80%.

When the dividing position is 55%, the modulation efficiency (the level of a reply signal) is maximized. However, the resistive part of a variable impedance element exerts the influence which is important to the efficiency of receiving power.

Also, when the dividing position is 80%, the resistive part of a variable impedance element doesn't influence to the efficiency of receiving power too much, though the modulation efficiency is decreased.

Thus, it is preferred that, when the resistance of the variable impedance element is small, the dividing position is approximately 55%, and when the resistance of the variable impedance element is relatively large, the dividing position is considerably further deviated from the center.

Example 1

Figure 3:
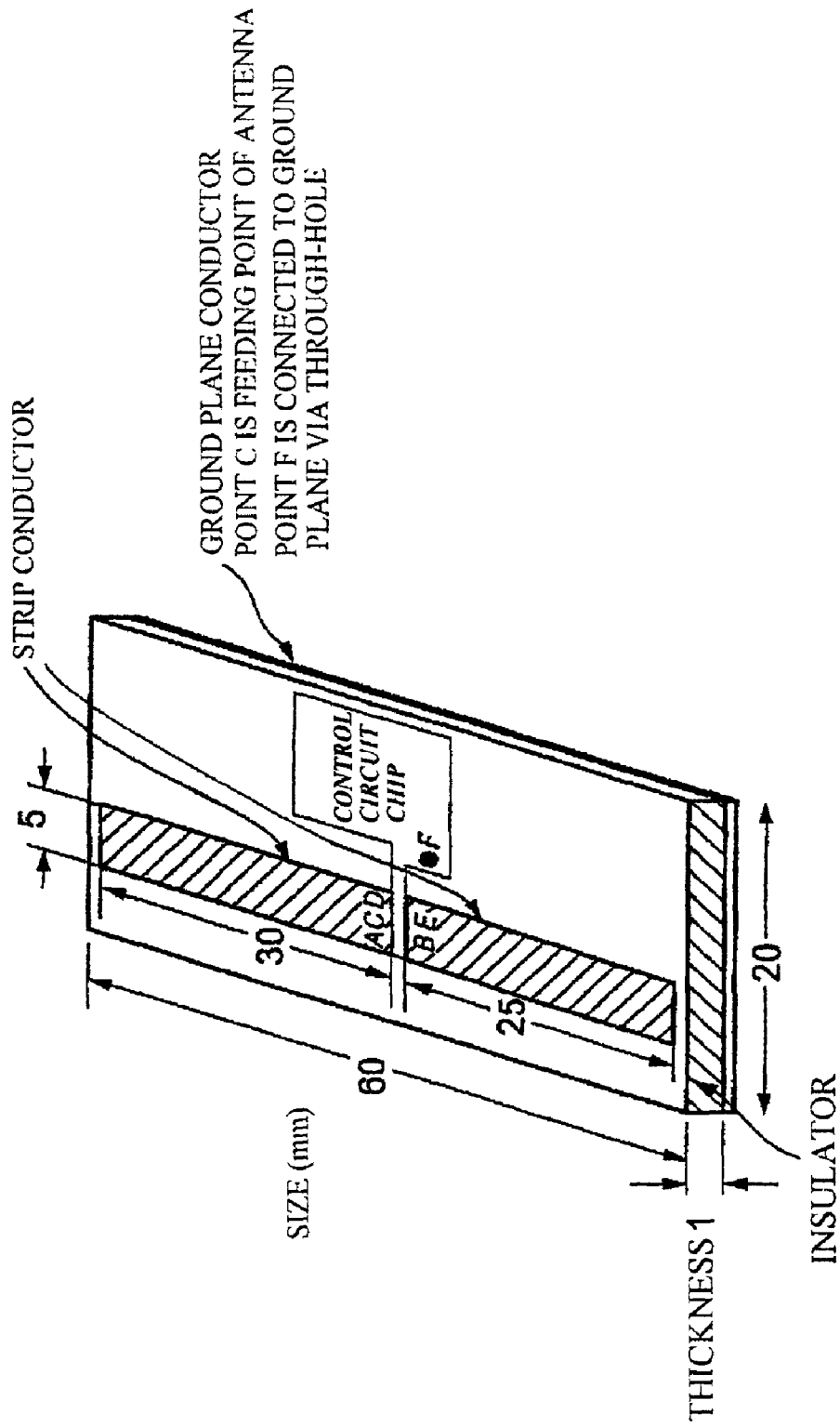
FIG. 3 is a perspective view illustrating Example 1 of the present invention.

FIG. 3 illustrates the basic configuration of an RFID tag device of the present invention. In this figure, the antenna of the RFID tag device includes a ground plane conductor, an insulating layer and a divided strip conductor. The RFID tag device shown in this figure is for use in the 2.45 GHz band, and all specified dimensions are in units of mm. Also, the dividing point of the divided strip conductor is deviated slightly more than equal division in the longitudinal direction, and this feature achieves the effect of improving the reception efficiency of the antenna.

Figure 4:
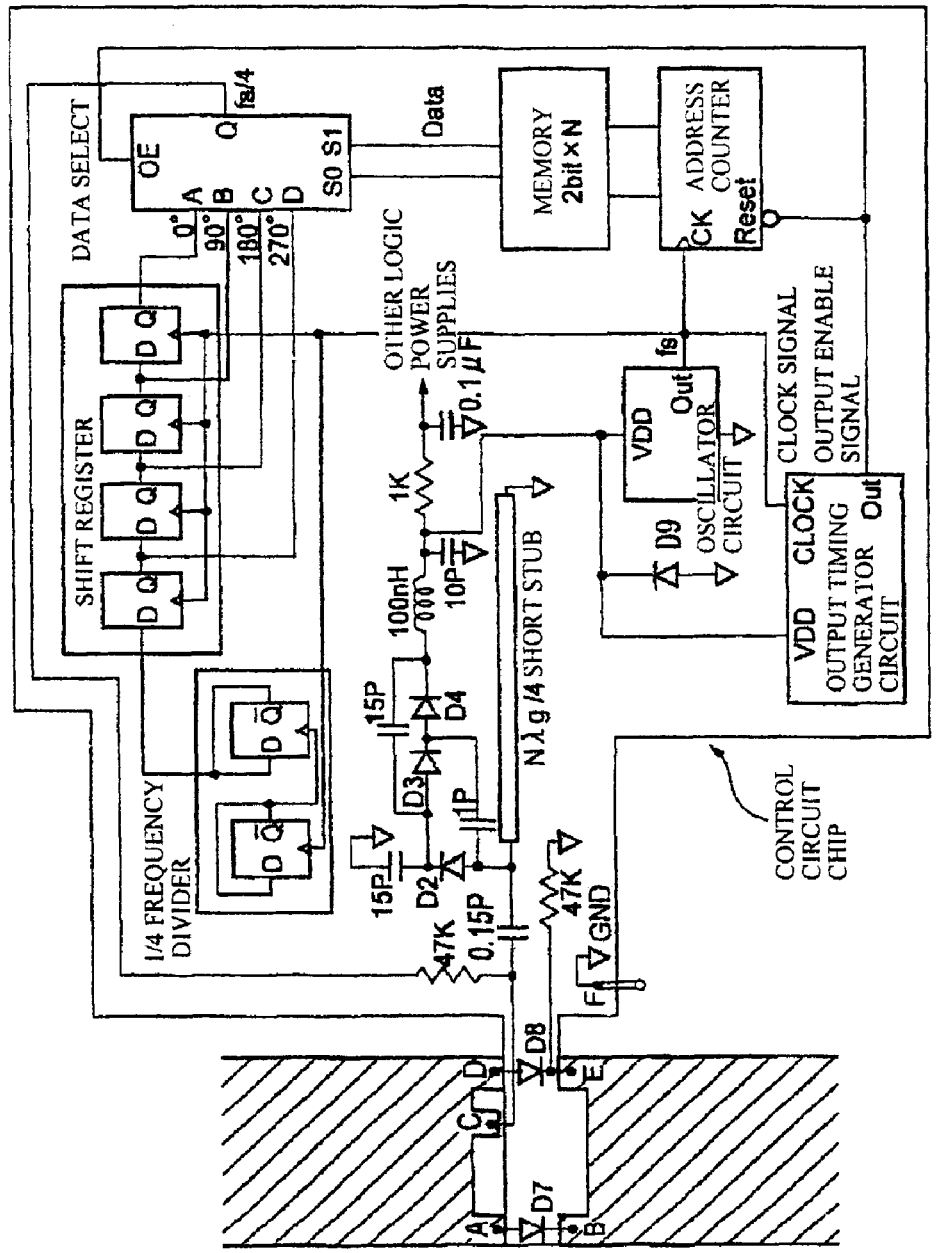
FIG. 4 is a top view illustrating a control circuit chip according to Example 1 of the present invention.

FIG. 4 illustrates the details of the control circuit chip shown in FIG. 3 and connections between the divided strip conductor and the control circuit.

In FIG. 4, the control circuit chip and the antenna are connected at six points A, B, C, D, E and F. PIN diodes D7 and D8 for impedance modulation are connected between A and B and between D and E, respectively, and a feeding point of the antenna lies between C and F. Here, the point C is slightly deviated from the center point of the strip conductor width, and this feature achieves the effect of improving the reception efficiency of the antenna. Also, the point F is connected to the ground plane conductor via a through-hole. The terminals C, E and F constitute the three terminals of the three-terminal circuit.

Figure 5:
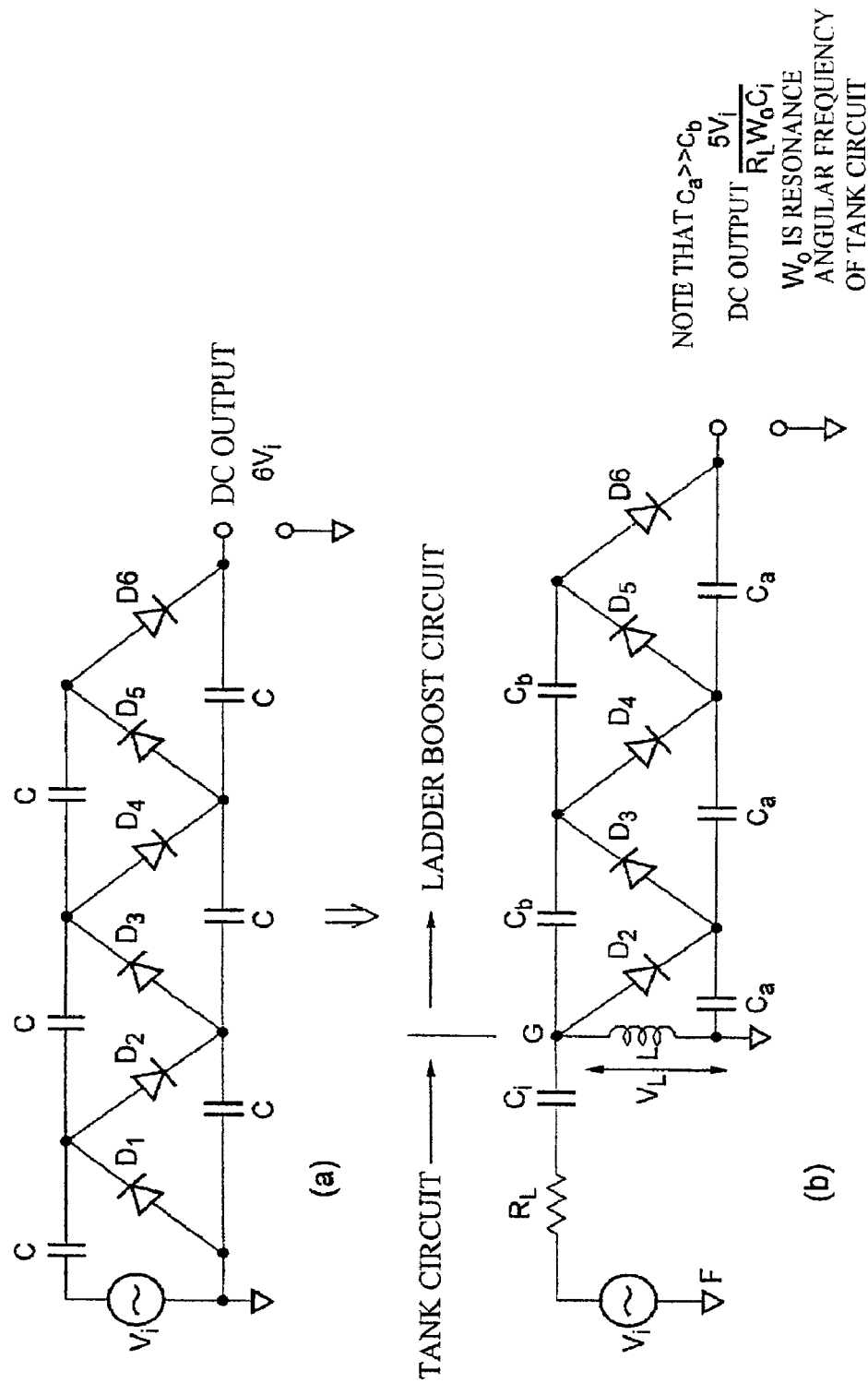
FIG. 5 is an equivalent circuit diagram illustrating an example of a boosting/rectification operation of the present invention.
Figure 10:
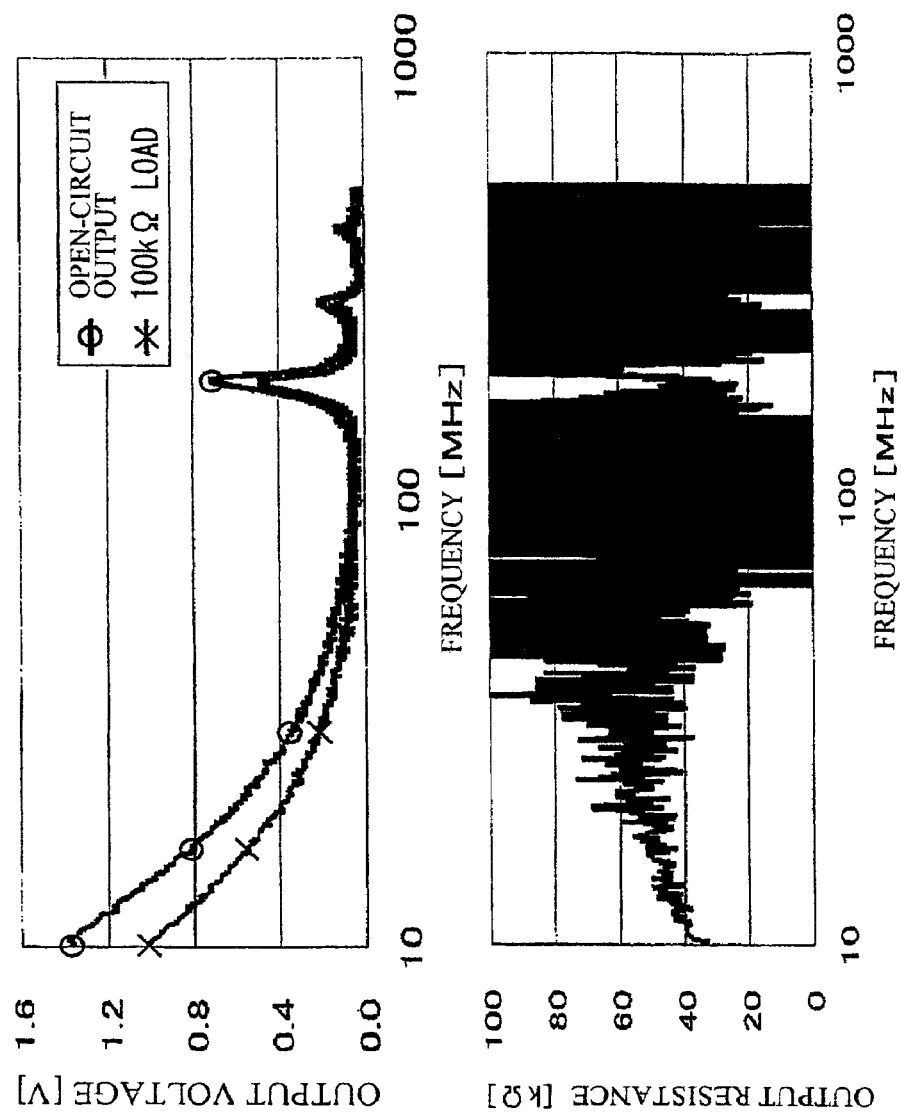
FIG. 10 is a graph showing a frequency response of a 10-stage Cockcroft-Walton circuit with a −3 dBm input, which uses HRU0302A ($C_o$=70 pF) as diodes.
Figure 11:
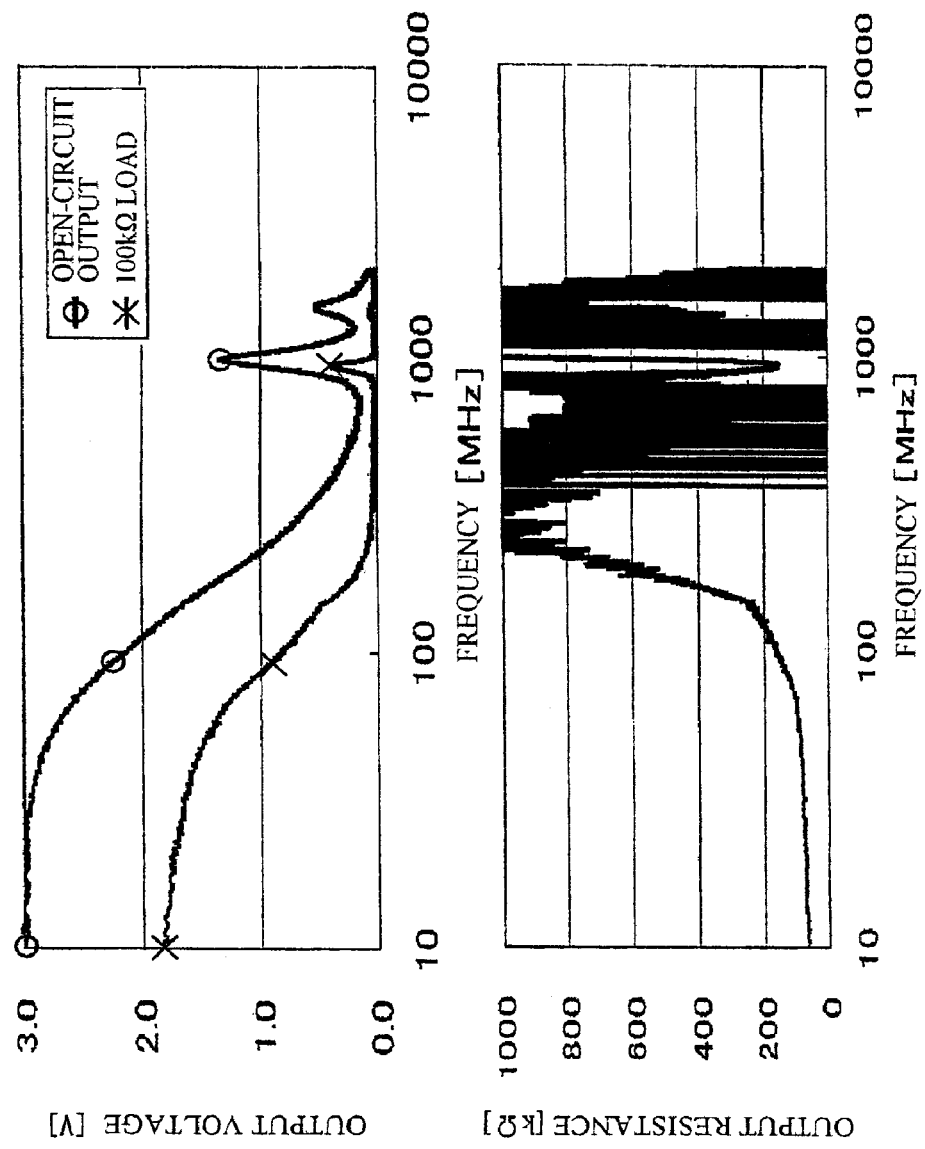
FIG. 11 is a graph showing a frequency response of a 10-stage Cockcroft-Walton circuit with a −3 dBm input, which uses HSB226 ($C_o$=2.4 pF) as diodes.

The operation principle of the power supply circuit in FIG. 4 is shown in FIG. 5. FIG. 5(a) is a boost rectifier circuit called "Cockcroft-Walton circuit", in which a plurality of rectifier diodes and capacitors are connected in a ladder configuration, so that a sine value signal with an amplitude of $V_i$ can be output after being rectified to a DC voltage of $K(V_i-1_j)$ greater than $V_i$ [K is the number of ladder steps; $1_j$ is a forward drop voltage of a diode]. However, as shown in FIGS. 10 and 11, this circuit has a drawback in that when it is used in a high frequency band (e.g., 2.45 GHz), the junction capacitance of each diode becomes input load and therefore input impedance becomes extremely low, which lowers the output voltage.

FIG. 5(b) is an operational principle diagram of the boost rectifier circuit of the present invention. An Nλg/4 short stub (λg is an effective wavelength of the transmission path; N is an odd number being 1 or 3) exhibits an equivalent impedance of an inductance having a high Q-value in a high frequency range with respect to an input signal in the vicinity of λg. Even if a ladder boost section of FIG. 5(b) is a capacitive load, an inductive impedance can be maintained by a parallel resonance operation. On the other hand, in a tank circuit boost section of FIG. 5(b), the inductive impedance and a capacitive feed impedance generate an RF signal, which has a large amplitude of $V_L=V_i/(R_L \cdot W_o) \gg V_i$, between G and F by a series resonance operation, so that the circuit of FIG. 5(b) can obtain a DC output voltage of $20V_i$ or more.

Figure 17:
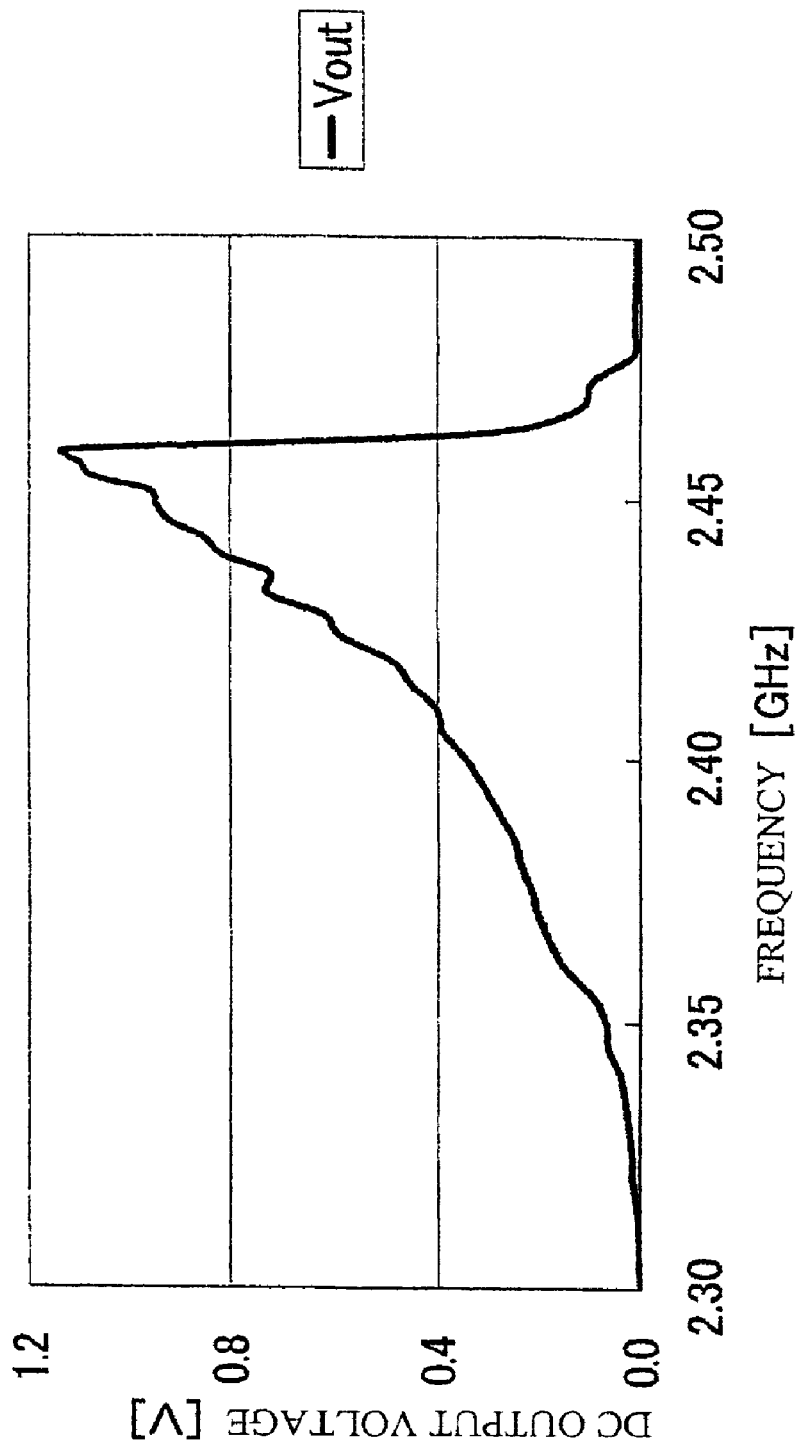
FIG. 17 a graph showing a frequency response of a stub resonance boost rectifier circuit of the present invention in the case where an RF input is −10 dBm and a DC load resistance is RL=33 kΩ.

FIG. 17 is a behavioral analysis result of the boost rectifier circuit of the present invention, from which it is appreciated how an input voltage of 50Ω/−10 dBm (0.07 $V_{rms}$) is boosted and rectified to 1 V or more at 2.45 GHz.

Next, the control circuit chip of FIG. 4 is described in detail.

Figure 12:
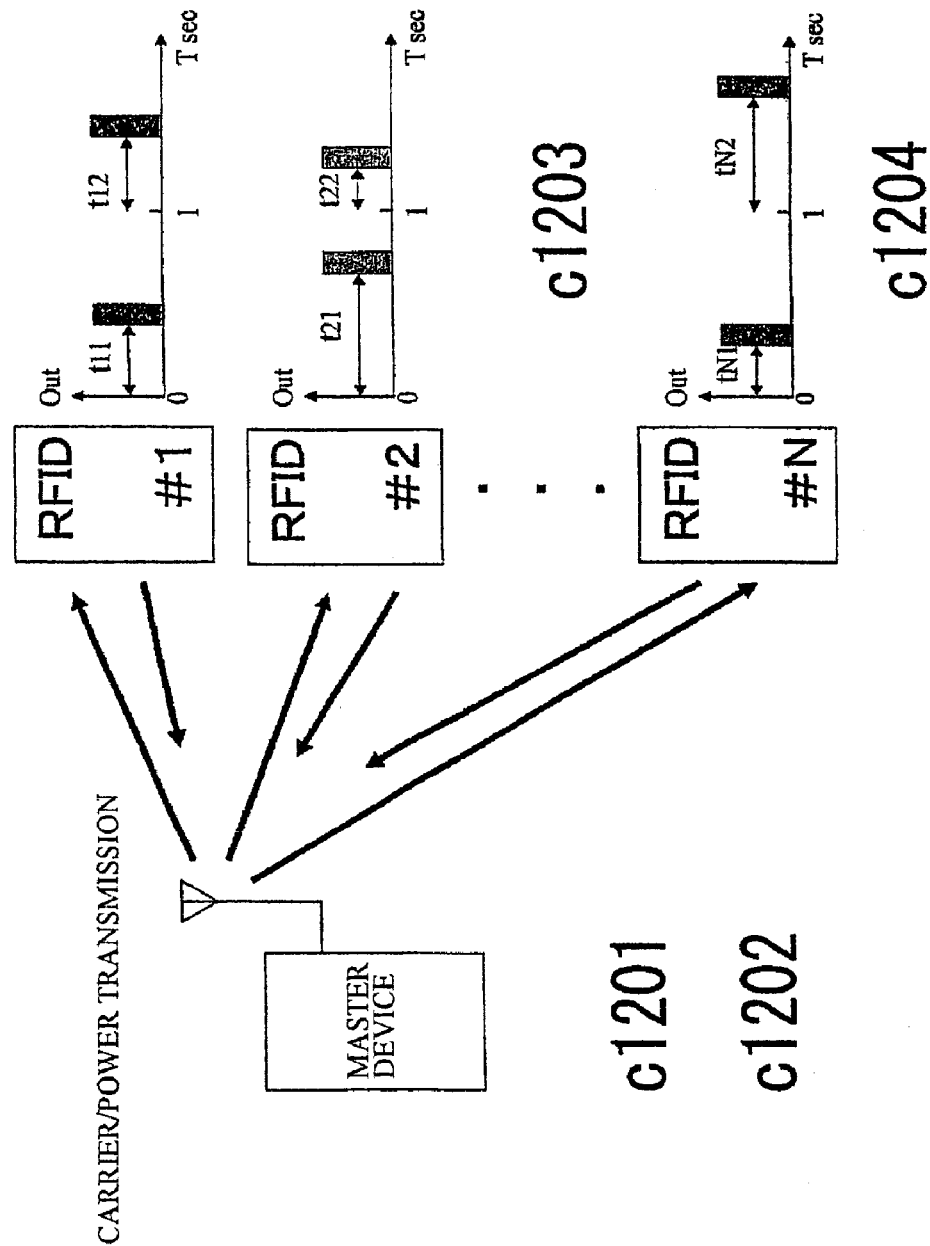
FIG. 12 is a diagram showing a batch reading method for a plurality of RFIDs, wherein $t_{mn}$ of each RFID is determined by generating random numbers, a carrier signal from a master device (an interrogator) is modulated, and returned in packets with an ID code being carried thereon; note that the master device is prepared for the case of single reading of a return signal from each RFID by using a semi-synchronous delay detection system (packets cannot be demultiplexed at the same time), and the case of double reading by using a carrier phase split synchronous detection system (two packets can be demultiplexed at the same time)
Figure 13:
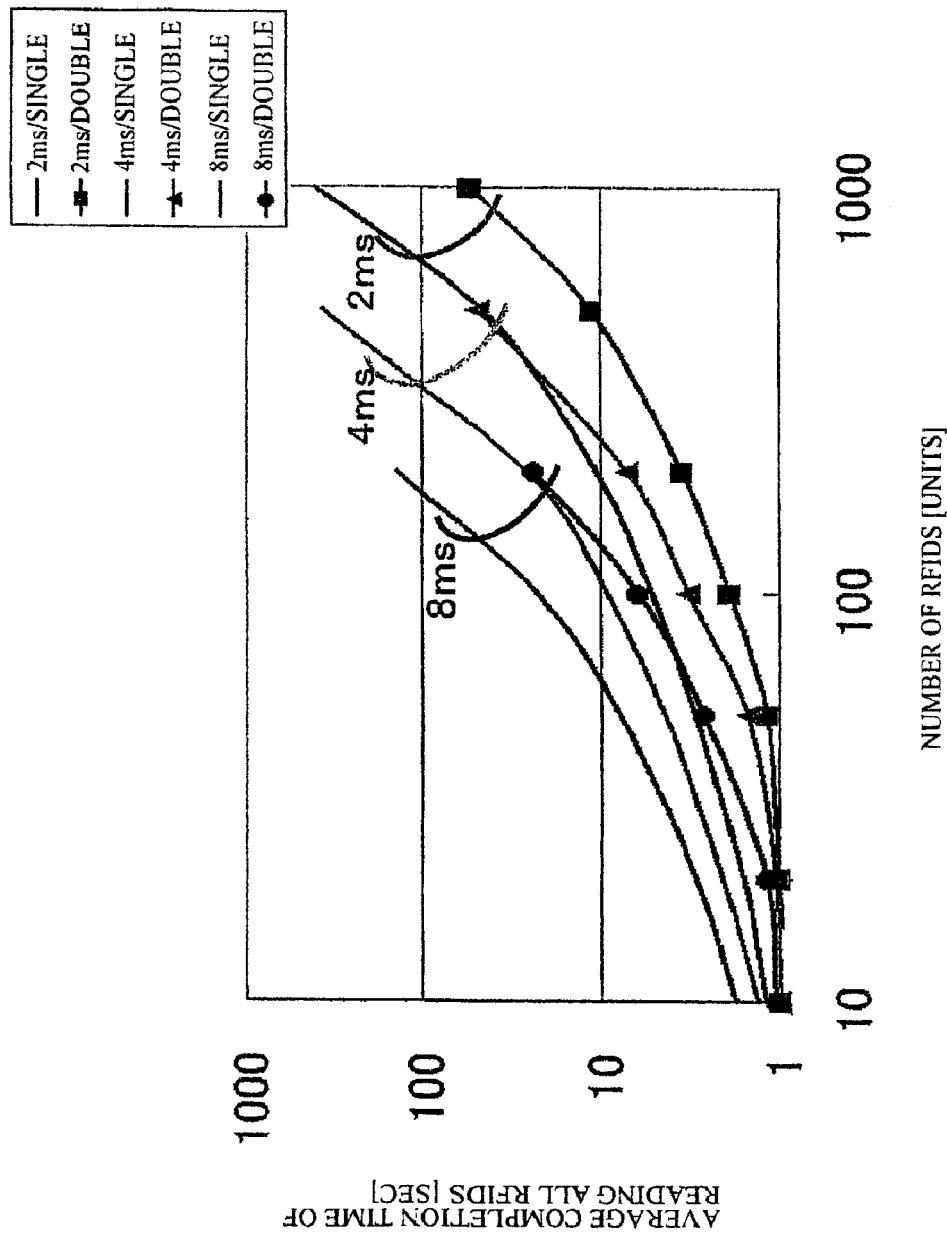
FIG. 13 is a graph showing a simulation result for an average completion time of reading in the case where the number of RFIDs and a packet duration are changed in a batch reading method for a plurality of RFIDs that performs packet transmission at random time within a 1-second frame.

When $V_{DD}$ is applied, an oscillator circuit generates a clock signal of $f_s$. When $V_{DD}$ and the clock signal are applied, an output timing circuit generates a timing signal (an output enable signal) for anticollision as shown in FIGS. 12 and 13. When the output enable signal and the clock signal are applied, an address counter outputs memory read addresses one after another for each clock "L" pulse. Note that the data transmission rate in this case is $2f_s/L$ (bit/sec) The memory sequentially outputs 2-bit information recorded at addresses designated by the address counter. A ¼ frequency divider outputs a signal corresponding to ¼ of $f_s$. A shift register operates in accordance with the clock $f_s$, and phase-shifts the output of the ¼ frequency divider in units of 90°. When the output enable signal is applied, a data selector selects and outputs one of four phase outputs (0° to 270°) of the shift register in accordance with a 2-bit memory output.

However, it is possible to apply MPSK modulation by using a 1/M frequency divider, an M-stage shift register and an M-input data selector. In this case, it is possible to achieve the effect of increasing the amount of information that is transmitted per unit transmission power.

Figure 14:
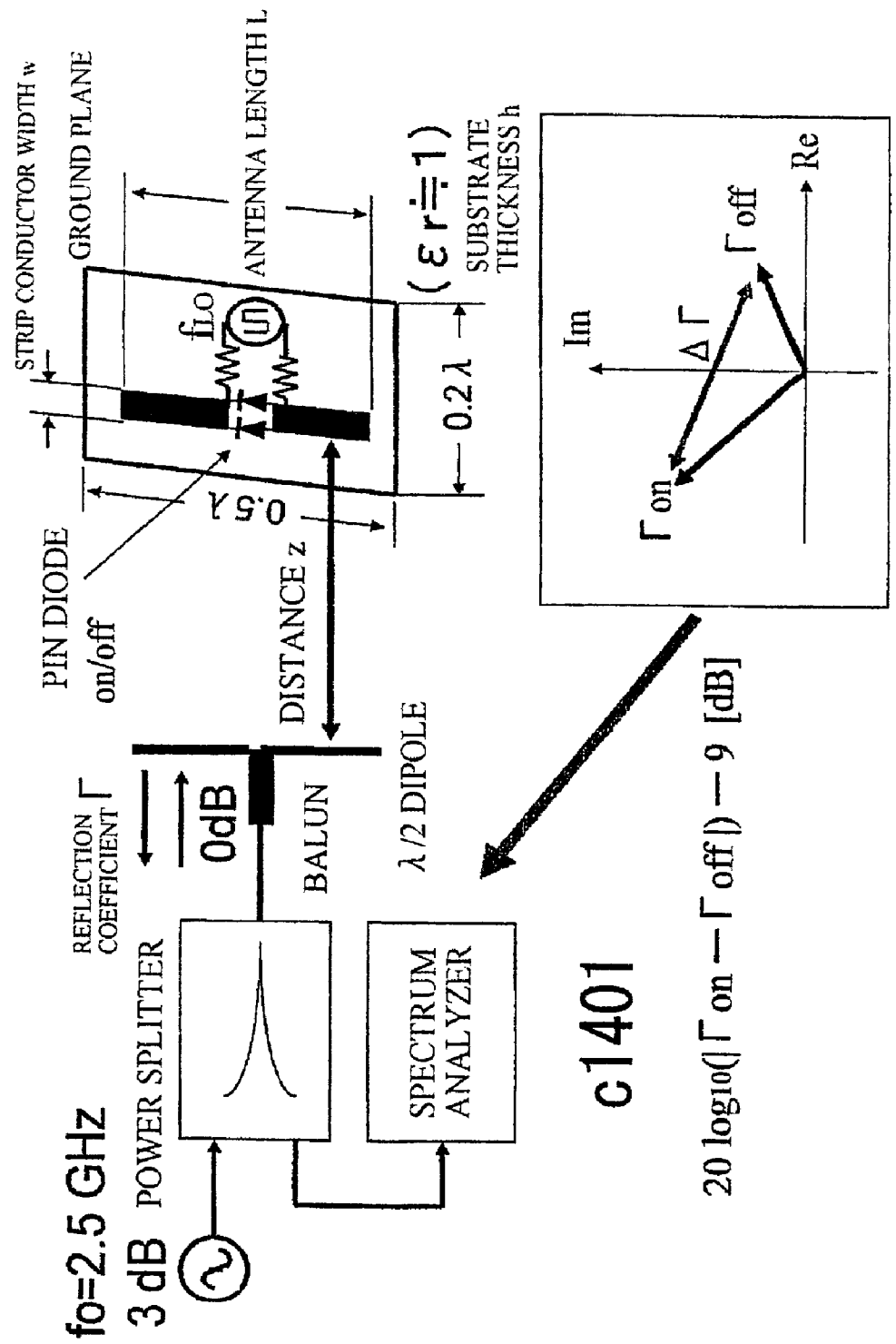
FIG. 14 is a diagram illustrating a planar antenna structure for RFID according to the present invention and a model for computer simulation; note that a spectrum analyzer in the diagram reads a received signal level of $f_0+f_{LO}$.
Figure 15:
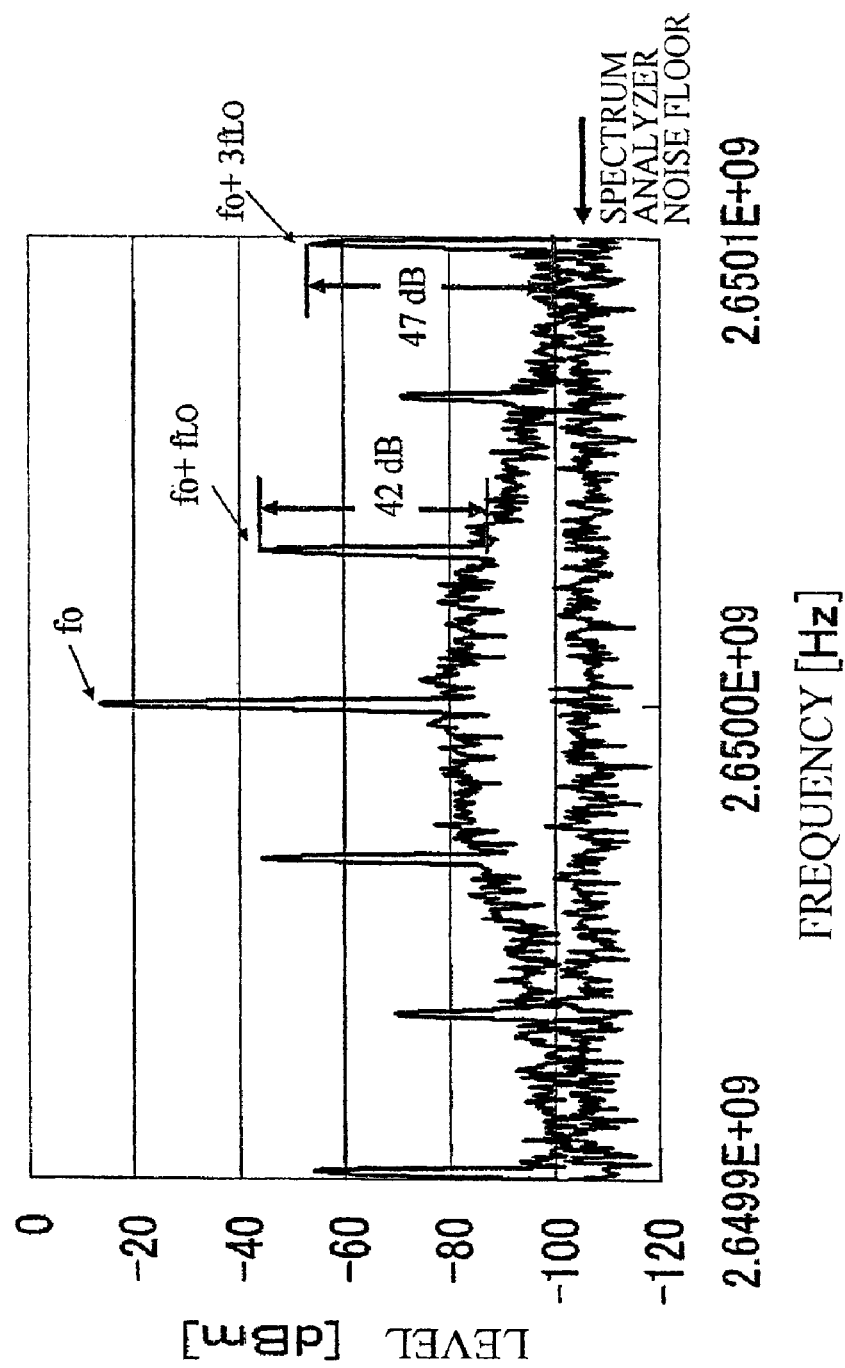
FIG. 15 is a graph showing a frequency spectrum of response reception signals from RFIDs, which is measured by using HP83620A (Synthesized Sweeper)

The output of the data selector changes the amplitude of current flowing through resistances to the PIN diodes D7 and D8 with a cycle of $f_s/4$, thereby modulating a connection impedance between the divided strip conductors. As shown in FIG. 14, the change of the impedance changes a mutual coupling impedance between an antenna of an interrogator and the antenna of the RFID tag, so that a reflection coefficient Γ of the antenna of the interrogator is changed with a cycle of $f_s/4$. FIG. 15 is an example of a signal measured with a spectrum analyzer. That is, from which it is possible to identify signal components ($f_O+f_{LO}$, $f_O+3f_{LO}$, etc.), which are generated as a result of an incident wave of $f_O$ having been modulated by the change of F with a cycle of $f_{LO}$. In this case, $f_{LO}=f_s/4$, and because the interrogator can accurately determine $f_O$, it is possible to readily evaluate the oscillating frequency $f_s$ of the oscillator circuit at the tag based on the measured spectrum ($f_O+f_{LO}$, $f_O+3f_{LO}$, etc.). Specifically, by using, for example, a quartz resonator temperature sensor as the oscillator circuit at the tag, it is also possible for the interrogator to monitor the ambient temperature at the point of the tag.

Incidentally, the microstrip antenna used for the RFID tag device of the present invention is explained with respect to its property. The microstrip antenna is configured simply by providing a ground plane close to a plate-like dipole antenna, and therefore might be considered as if it is an antenna that behaves as a dipole, but in fact, its behavioral principle is considerably different from that of the dipole antenna. Specifically, the dipole antenna is an electric current antenna, and the microstrip antenna is a magnetic current antenna. The reason why in the present invention, two PIN diodes for impedance modulation are provided at opposite ends of the strip conductors in the width direction is that electric current flowing through the strip conductors is concentrated at the opposite ends in the width direction.

Figure 16:
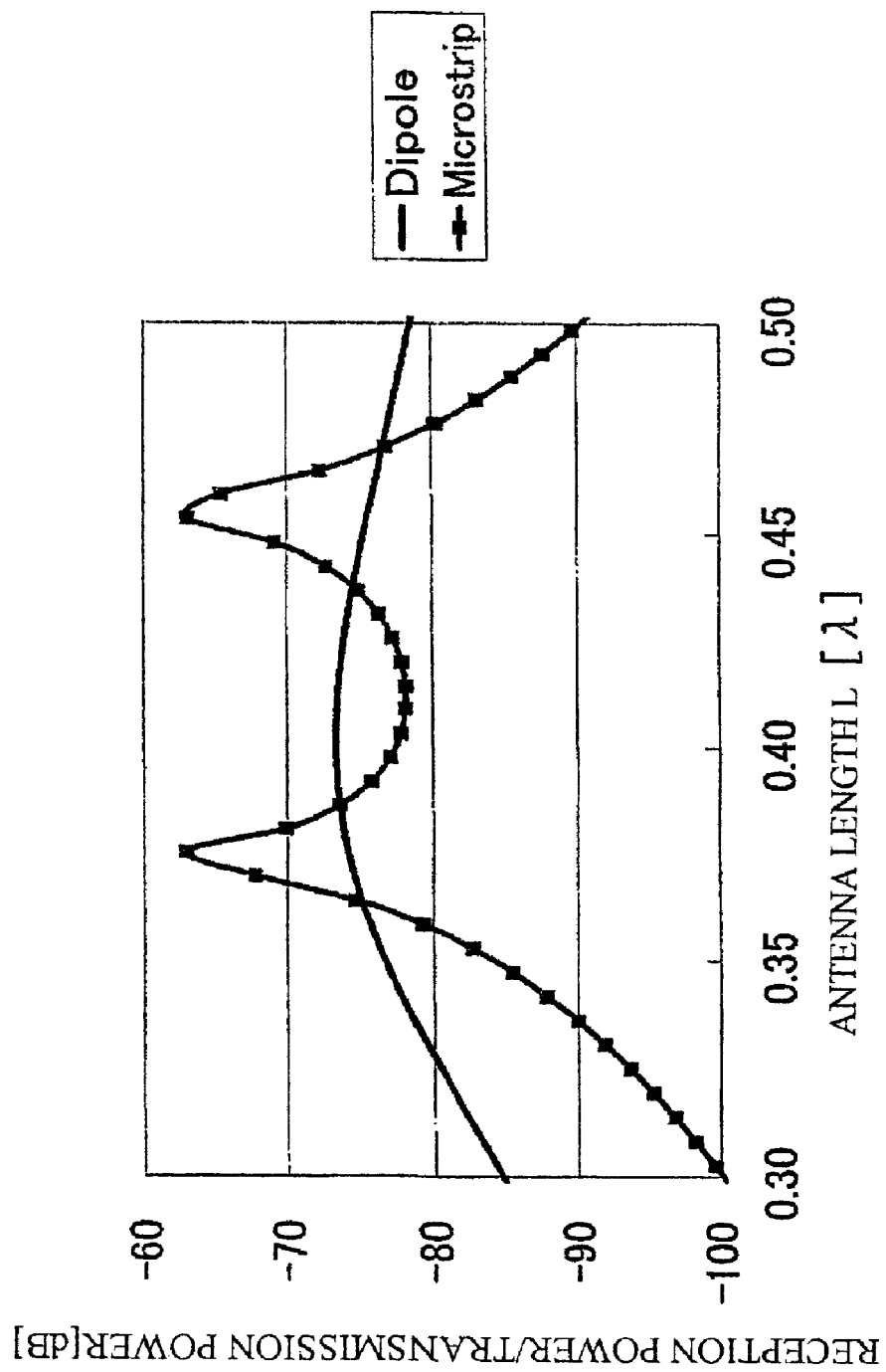
FIG. 16 is a graph showing a result of comparing between the conventional art (dipole) and the present invention (microstrip) with respect to the level of a response reception signal from an RFID at a distance z=5λ when a λ/2 dipole is used as a transmitting/receiving antenna of an interrogator.

FIG. 16 is an example of analyzing the level of a response signal that can be received by an interrogator by using antenna length L as a parameter in the evaluation system of FIG. 14, with respect to the case where a conventional dipole antenna having no ground plate is used in an RFID tag and the case where the divided microstrip antenna of the present invention is used in an RFID tag. As can be seen from this figure, the method of the present invention is capable of receiving the response signal with a level greater by about 10 dB (10 times greater power) compared to the conventional method.

Figure 18:
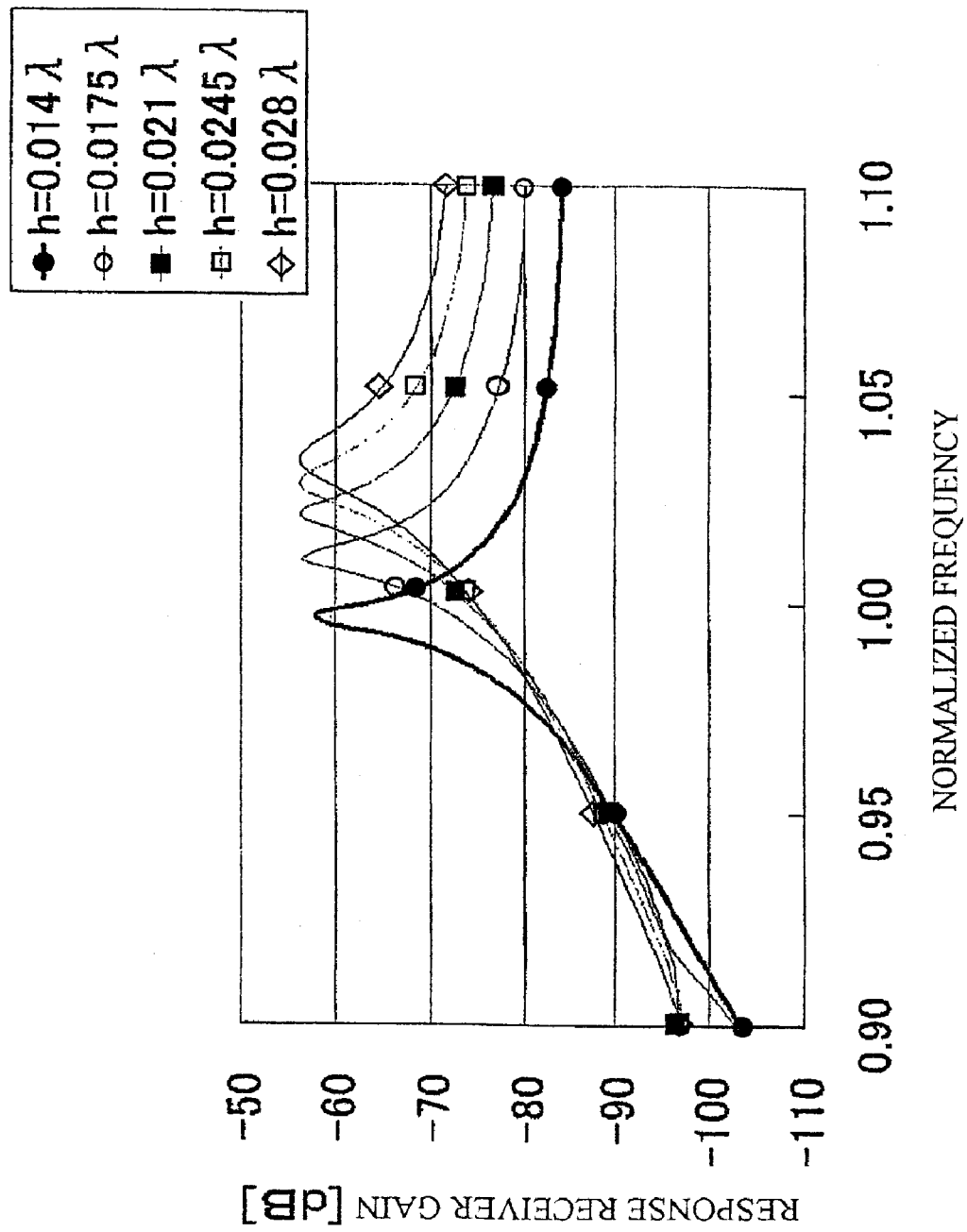
FIG. 18 is a graph for a comparison of frequency characteristics of gain with respect to a response reception signal from an RFID when the distance between an interrogator and the RFID is z=5λ, by changing a height h between a microstrip line and GND; note that the length L=0.36λ and width w=0.0525λ of the microstrip line, and the equivalent series resistance R=0Ω and equivalent junction capacitance $C_o$=1 pF of a PIN diode are fixed.
Figure 19:
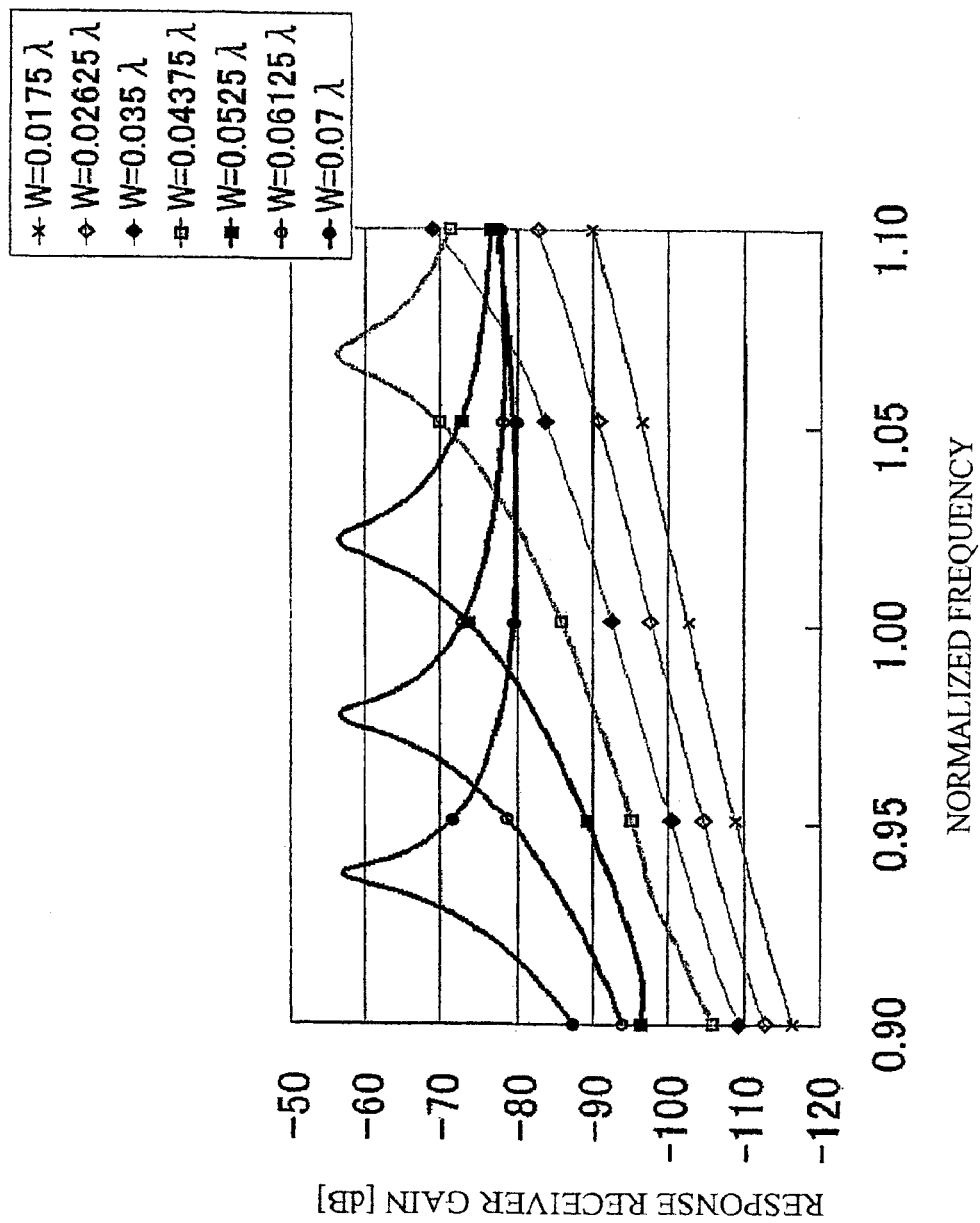
FIG. 19 is a graph for a comparison of frequency characteristics of the gain of a response reception signal from an RFID when the distance between an interrogator and the RFID is z=5λ, by changing the width w of a microstrip line; note that the length L=0.36λ and height h=0.021λ of the microstrip line, and the equivalent series resistance R=0Ω and equivalent junction capacitance $C_o$=1 pF of a PIN diode are fixed.
Figure 20:
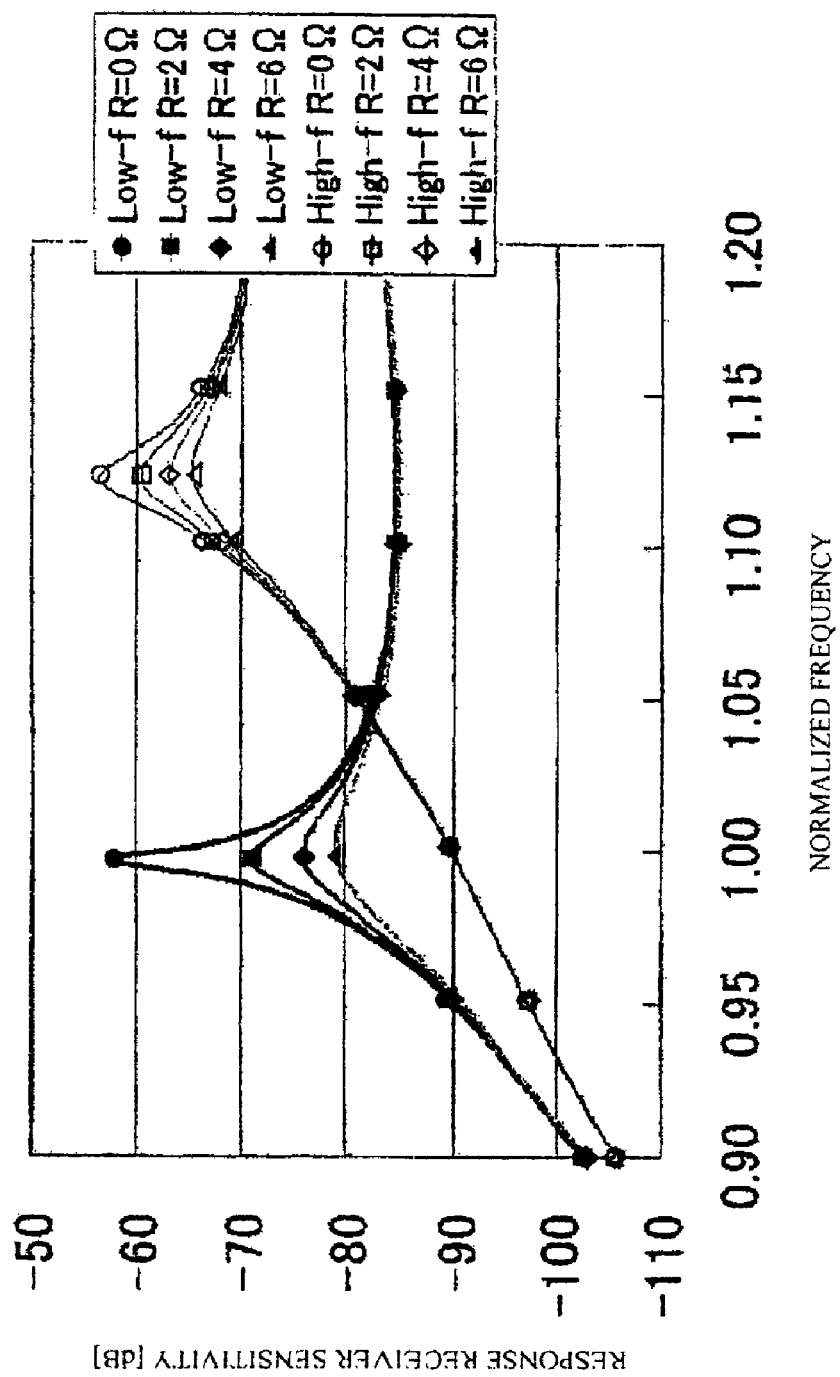
FIG. 20 is a graph for a comparison of frequency characteristics of gain with respect to two types of response reception signals Low-f and High-f from an RFID when the distance between an interrogator and the RFID is z=5λ, by changing the equivalent series resistance R of a PIN diode in case of a short circuit; note that the equivalent junction capacitance $C_o$=1 pF of the PIN diode in case of an open circuit is fixed; also the length L=0.36λ of the microstrip line is fixed, and the height and width thereof are respectively h=0.014λ and w=0.0525λ in the case of Low-f and h=0.028λ and w=0.035λ in the case of High-f.

FIGS. 18 through 20 show changes in frequency at response receiver levels in the evaluation system of FIG. 14 with respect to design parameters w and h of the microstrip antenna (it is assumed that L=0.36λ is fixed). It can be appreciated from FIG. 18 that by reducing h (the thickness of an insulator), it is possible to make adaptation to lower frequencies with the same size (size reduction with the same frequency), but an available frequency bandwidth becomes narrow.

Also, it can be appreciated from FIG. 19 that by increasing w (the strip conductor width), it is possible to make adaptation to lower frequencies with the same size, but an available frequency bandwidth becomes narrow.

FIG. 20 is a result of analyzing influences of a series resistance in PIN diodes for impedance modulation that are exerted on the receiver level with respect to the cases of making adaptation to lower and higher frequencies with the same size. As can be seen from this figure, in the case of size reduction with the same frequency (reduction in h, increase in w), considerable influences are exerted by the series resistance of the PIN diodes, and therefore it is necessary to reduce the resistance in order to obtain a high response receiver level.

In order to allow the PIN diodes to operate with low resistance, there is no choice but to apply a large current or increase junction capacitance (large area, short junction). The large current increases power consumption of the RFID tag device, and therefore is undesirable.

Figure 21:
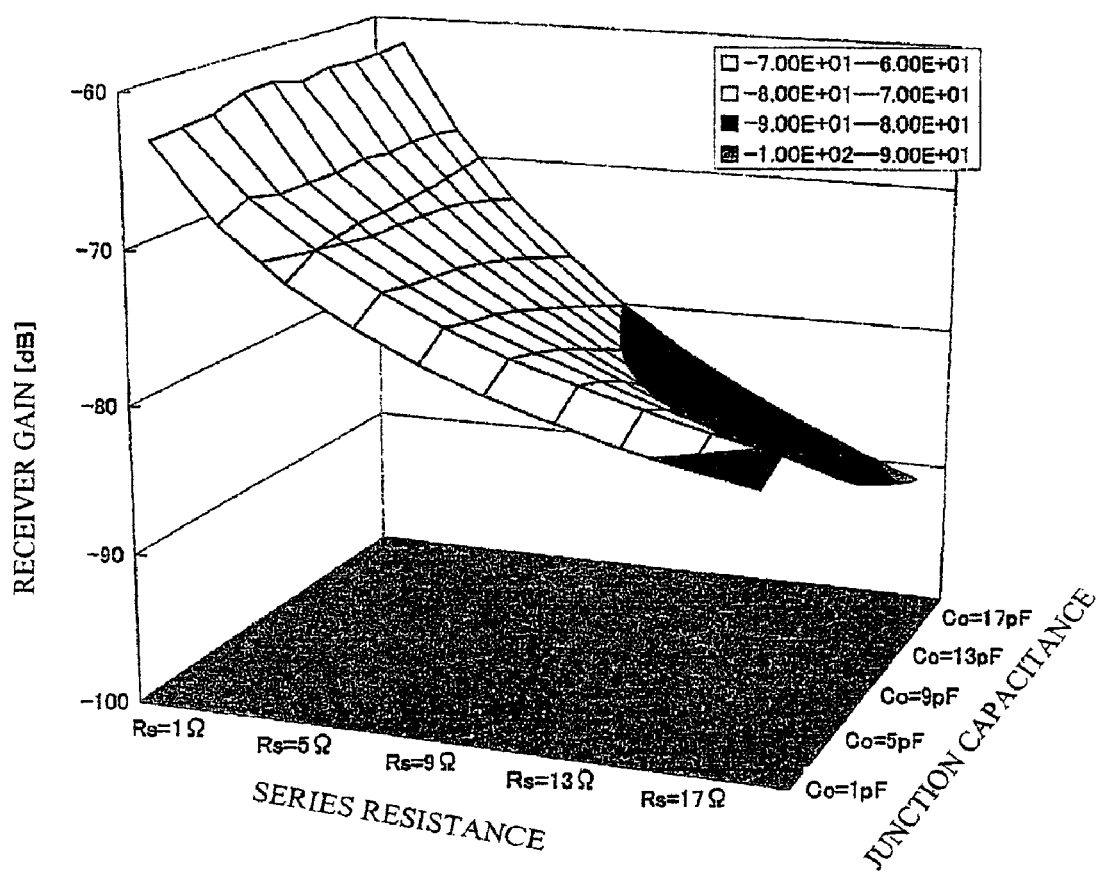
FIG. 21 is a graph for a comparison of frequency characteristics of the gain of a response reception signal from an RFID with respect to the maximum value when the distance between an interrogator and the RFID is z=5λ, by changing the equivalent series resistance and equivalent junction capacitance of a PIN diode.

FIG. 21 is a result of analyzing a maximum response receiver level in the evaluation system of FIG. 14 by using the series resistance and junction capacitance of the PIN diodes as parameters. As can be seen from this figure, the response receiver level does not change substantially when the junction capacitance of the PIN diodes is increased, and therefore it is possible to obtain a high response receiver level even by using relatively low-cost PIN diodes.

Also, instead of the PIN diodes, it is possible to use varactor diodes, and transistors such as MOSFET may also be used. In such a case, it is possible to further reduce the power consumption.

Also, when considering longitudinal connections of capacitors in a ladder boost rectifier circuit of a power receiving circuit as GND- and receiving-side rails, it is possible to consider diodes as rungs that join them. Capacitances of all the capacitors are normally equalized to maximize the booster efficiency, but in the present invention, the capacitor capacitance of the receiving-side rail is made smaller by one digit compared to that of the GND-side rail (specifically, GND-side rail: receiving-side rail=1:0.05), and the first diode (between the GND and the receiving point) is eliminated, whereby it is possible to reduce input load capacity and receive a high-frequency and high-impedance input with a DC short.

Example 2

A Method for Detecting the Position of a Moving Object without an RFID Tag

The feature of the RFID tag of the present invention that is capable of relatively long range communication in spite of having no power supply is utilized.

Figure 6:
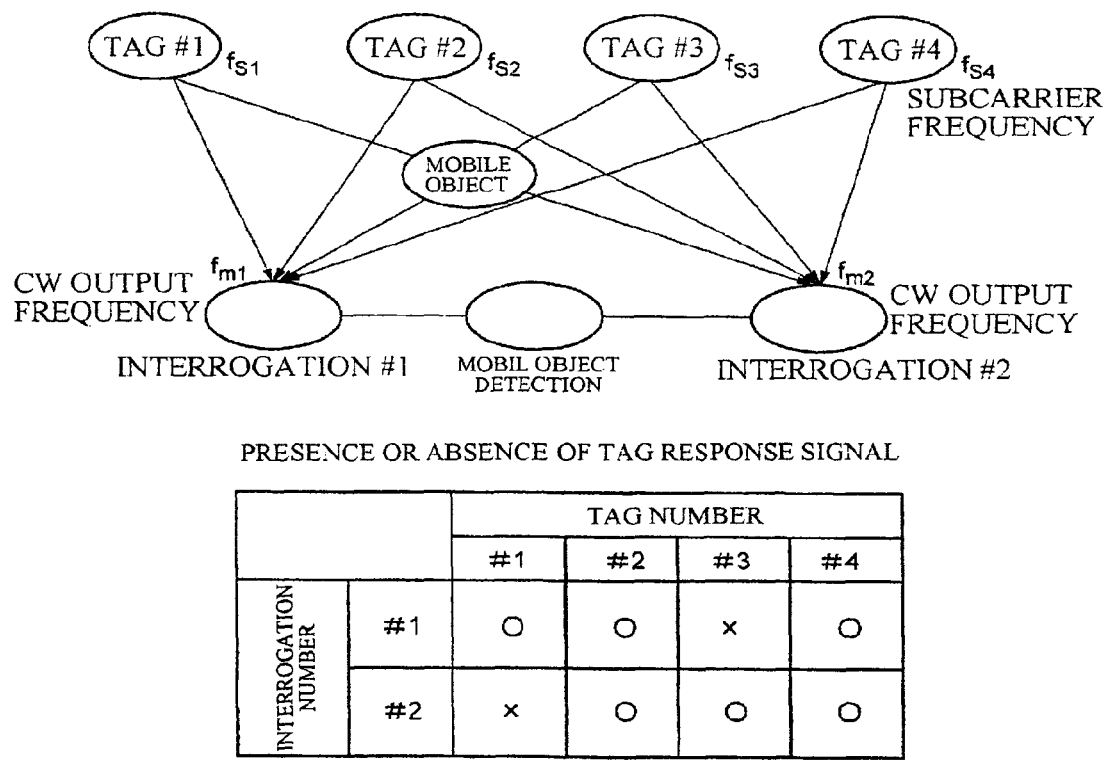
FIG. 6 is a diagram illustrating Example 2 of the present invention.

Assuming that the positions of tags #1 through #4 and interrogators #1 and #2 are known as shown in FIG. 6, it is possible to estimate the position of a mobile object based on information concerning paths obstructed by the moving object.

In this case, a system may be configured such that $f_{m1}=f_{m2}$, $f_{s1}=f_{s2}=f_{s3}=f_{s4}$, the interrogators provide CW outputs in a time-division system, and the tags respond by an anticollision method.

Further, a system may be configured such that $f_{m1}\ne f_{m2}$, $f_{s1}=f_{s2}=f_{s3}=f_{s4}$, the interrogators successively provide CW outputs, and the tags respond by an anticollision method.

Furthermore, a system may be configured such that $f_{m1}\ne f_{m2}$, $f_{s1}$, $f_{s2}$, $f_{s3}$ and $f_{s4}$ are all different frequencies, and the interrogators successively provide CW outputs.

Example 3

A Method for Detecting the Position of a Moving Object with RFID

The feature of the RFID tag of the present invention that is capable of relatively long range communication in spite of having no power supply is utilized.

Figure 22:
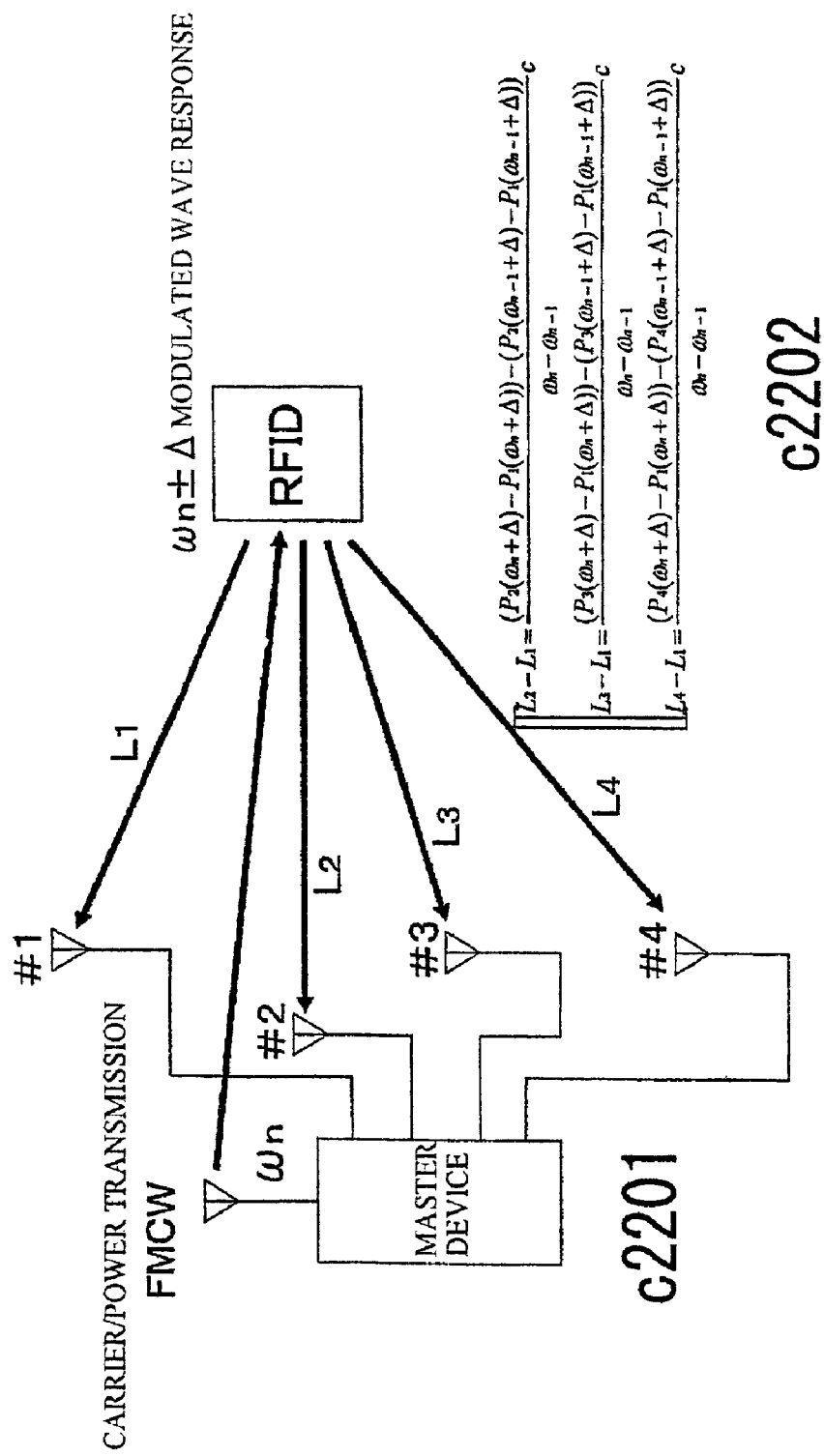
FIG. 22 is a diagram according to Example 3 of the present invention, showing a method for estimating a three-dimensional location of an RFID based on a difference in reception phase of a response signal from the RFID, which is obtained by a master device (an interrogator) transmitting an FMCW carrier signal; note that synchronous detection of $\omega_n+\Delta$ is performed for each signal received by antennas of the master device, the three-dimensional location is estimated based on at least three parameters in the equation of the diagram; in this case, a reflected wave is also received by the estimation device, and therefore a time-delay measurement technique based on the MUSIC algorithm or the like is used for a response signal even if it is of a multi-frequency type.
Figure 23:
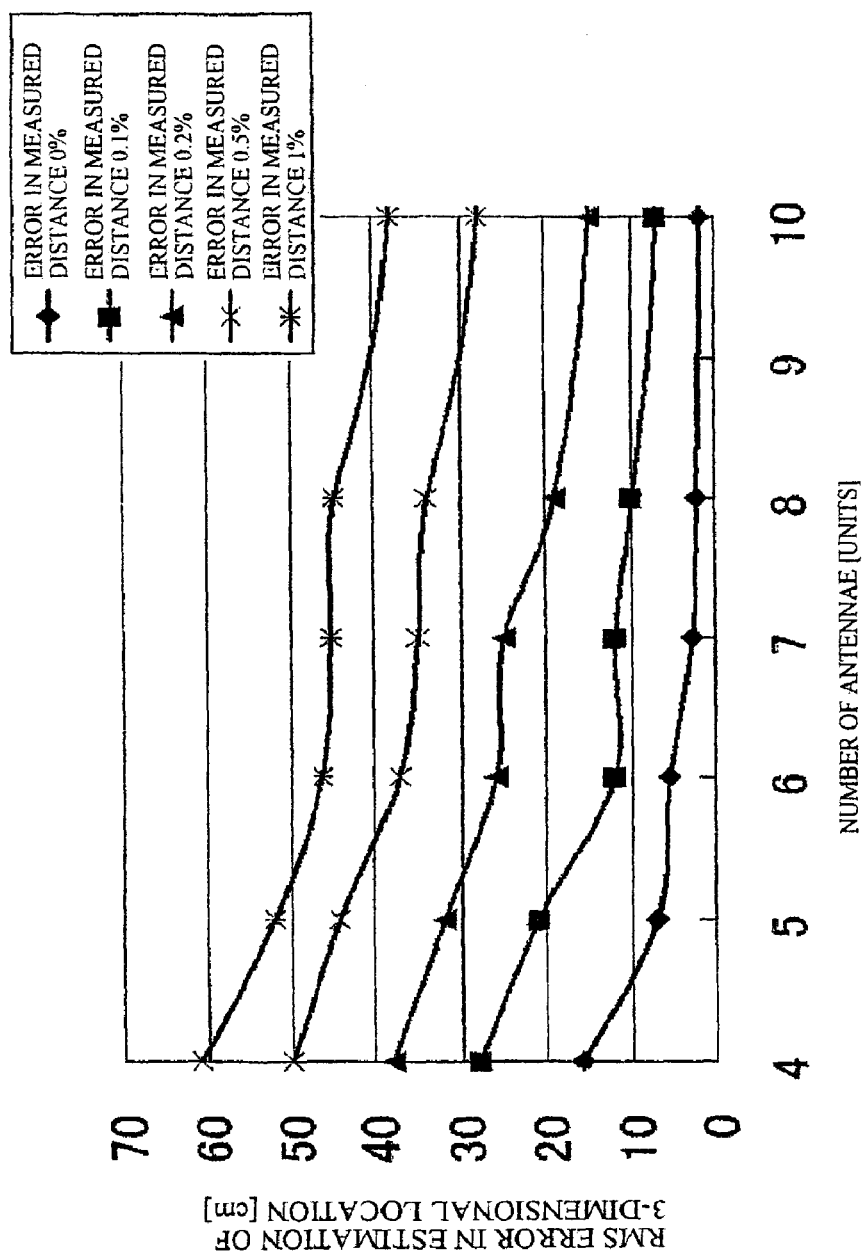
FIG. 23 is a graph showing a simulation result of estimating a three-dimensional location of an RFID according to Example 3 of the present invention, which is obtained as an average in 100 rounds with respect to RMS positional error; note that the RFID is positioned at random within a range of 6 m×6 m×6 m, and spacing between receiving antennas of an interrogator is 50 cm.
Figure 24:
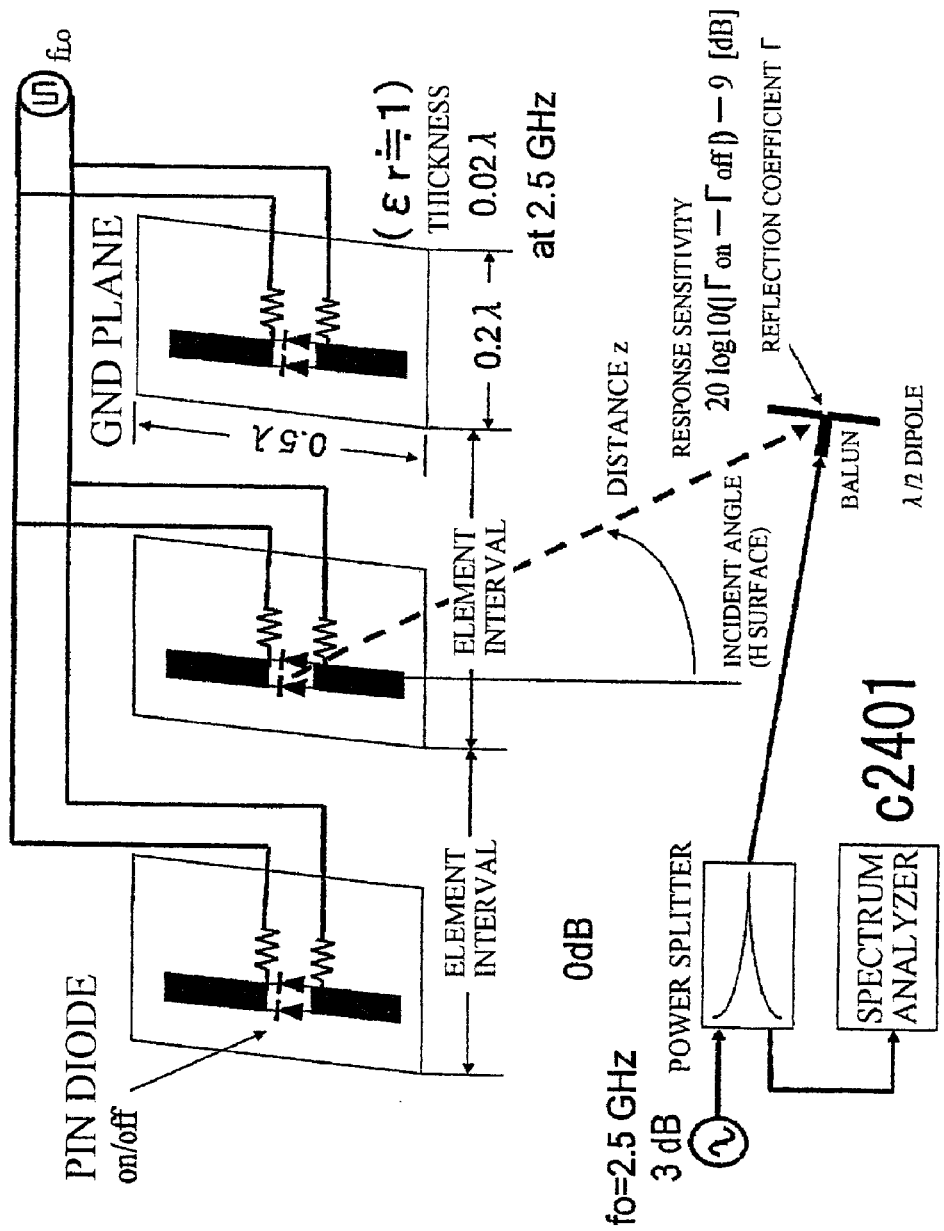
FIG. 24 is a diagram according to Example 4 of the present invention, showing the case of expanding a communication range for in-phase modulation by forming an array of RFID microstrip elements; note that a spectrum analyzer in the diagram reads a received signal level of $f_0+f_{LO}$.
Figure 25:
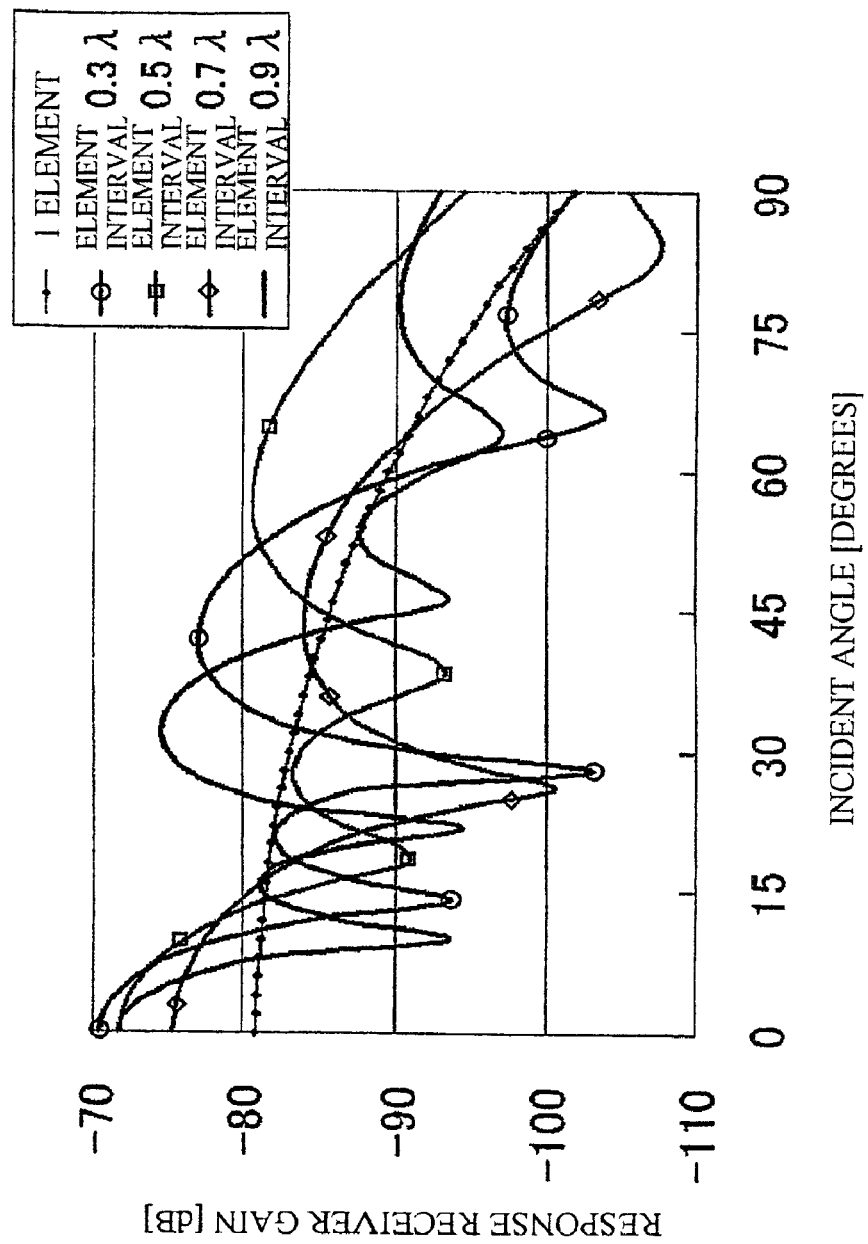
FIG. 25 is a graph of an analysis result of the directionality of sensitivity for receiving a response from the RFID shown in FIG. 24 according to Example 4 of the present invention in the case where a dipole is used as a transmitting and receiving antenna of an interrogator at a distance of z=20λ; the microstrip element is configured such that L=0.36%, w=0.0525λ and h=0.02λ, and this figure was compared between the case where only one element is used and the cases where three elements are used with the different spacing of the elements.
Figure 26:
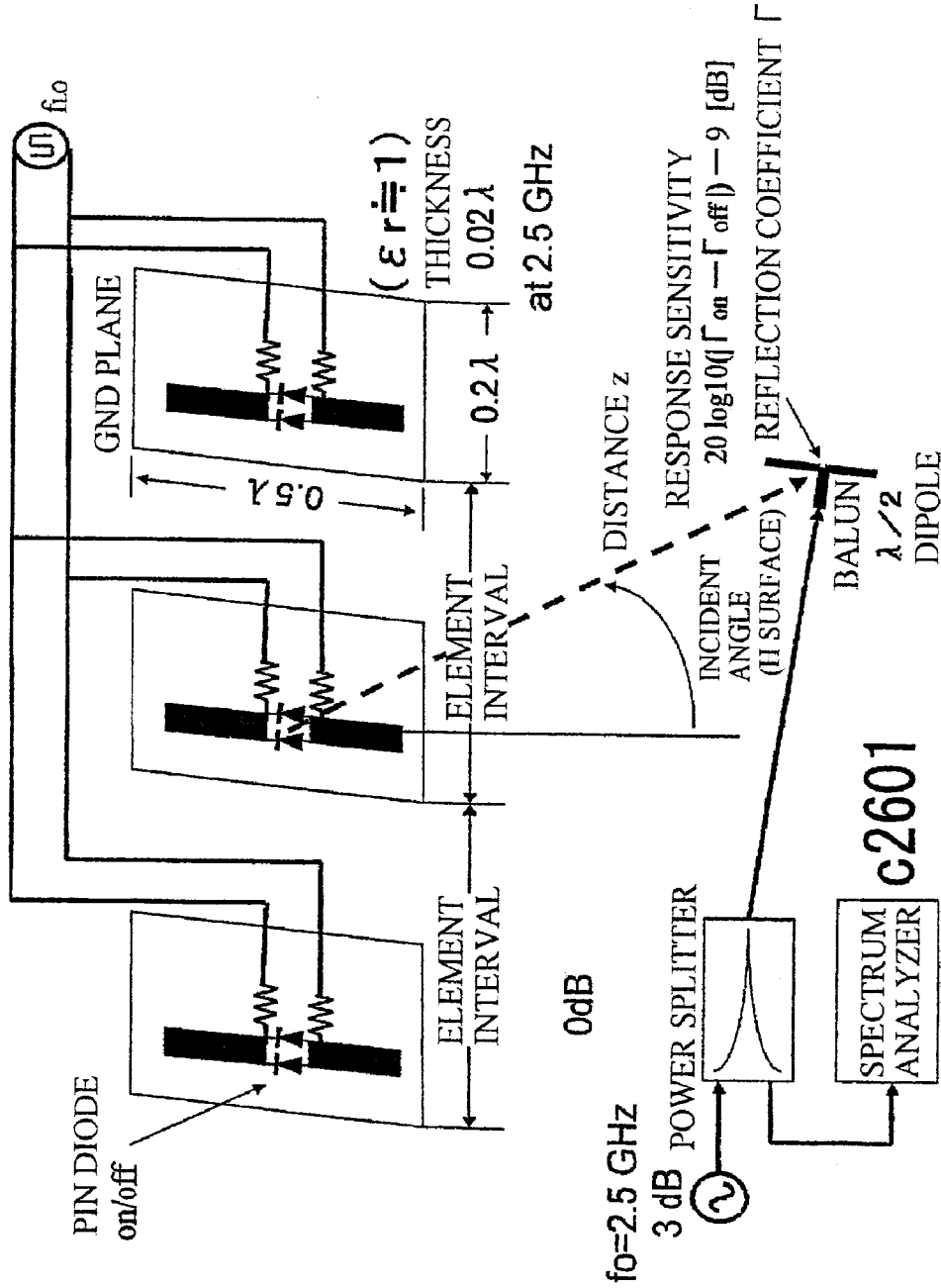
FIG. 26 is a diagram according to Example 4 of the present invention, showing the case of expanding a communication range for reversed-phase modulation by forming an array of RFID microstrip elements; note that a spectrum analyzer in the diagram reads a received signal level of $f_0+f_{LO}$.
Figure 27:
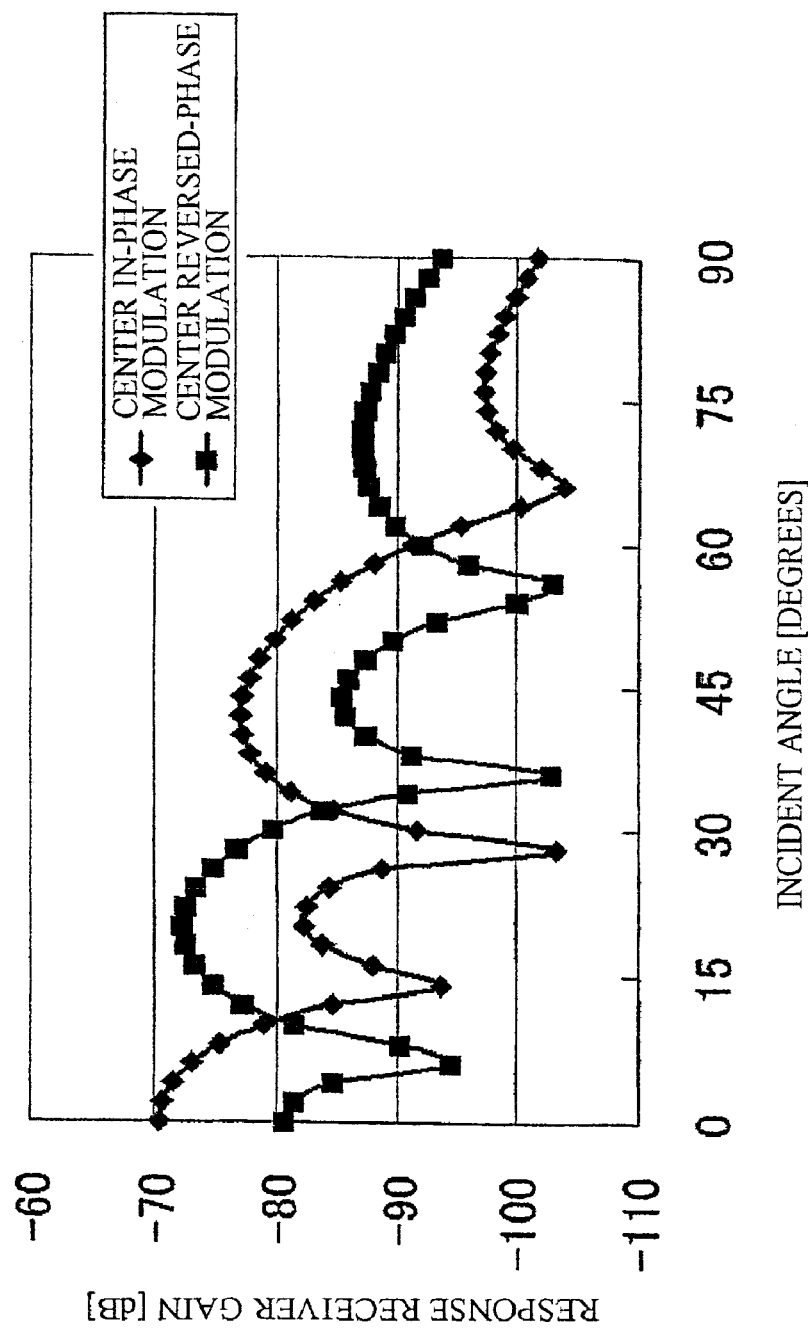
FIG. 27 is a graph of an analysis result of the directionality of sensitivity for receiving a response from the RFID shown in FIG. 26 according to Example 4 of the present invention in the case where a dipole is used as a transmitting and receiving antenna of an interrogator at a distance of z=20λ; the microstrip element is configured such that L=0.36λ, w=0.0525λ, h=0.02λ, and three elements are spacing of 0.7λ, and this figure was compared between the case where the center element is operated in the in-phase modulation mode and the case where the center element is operated in the reversed-phase modulation mode.
Figure 28:
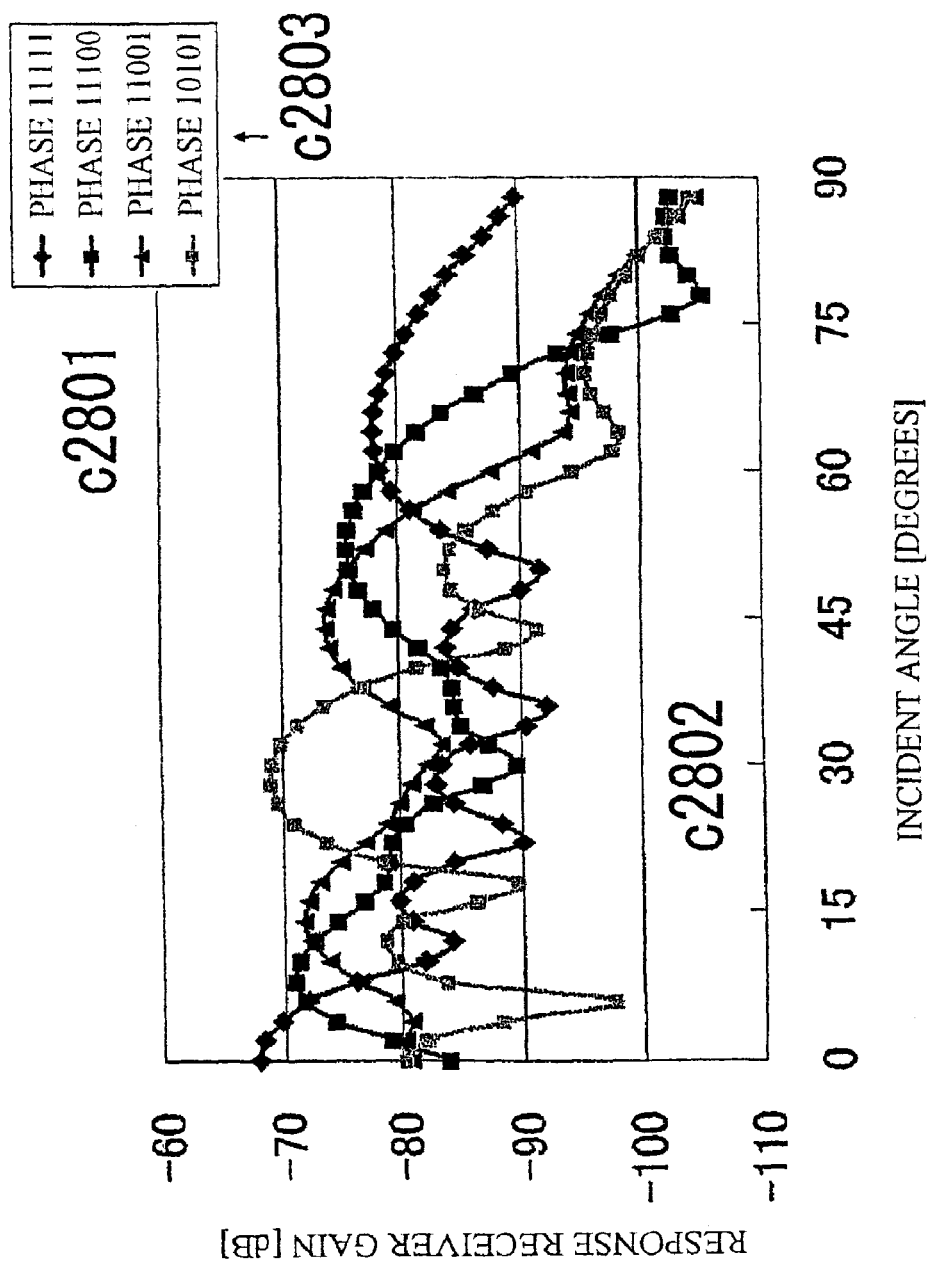
FIG. 28 is a graph of an analysis result of the directionality of sensitivity for receiving a response from the RFID shown in FIG. 26 according to Example 4 of the present invention in the case where a dipole is used as a transmitting and receiving antenna of an interrogator at a distance of z=20λ; the microstrip element is configured such that L=0.36λ, w=0.0525λ, h=0.02λ, and five elements are spacing of 0.5λ, and this figure shows results by changing combinations of modulation phases of each element; Phase XXXXX in the graph (where X is 0 or 1) represents a modulation phase of each element and a phase difference of 180° is present between 0 and 1; this graph shows that high response sensitivity can be obtained in a wide range by sequentially changing modulation phases of each element.

As shown in FIGS. 22 and 23, a plurality of receiving antennas are used at the master device, and CW signals are transmitted at two or more frequencies to detect differences in phase between response signals from RFID tags, making it possible to estimate three-dimensional locations of the RFID tags.

Figure 7:
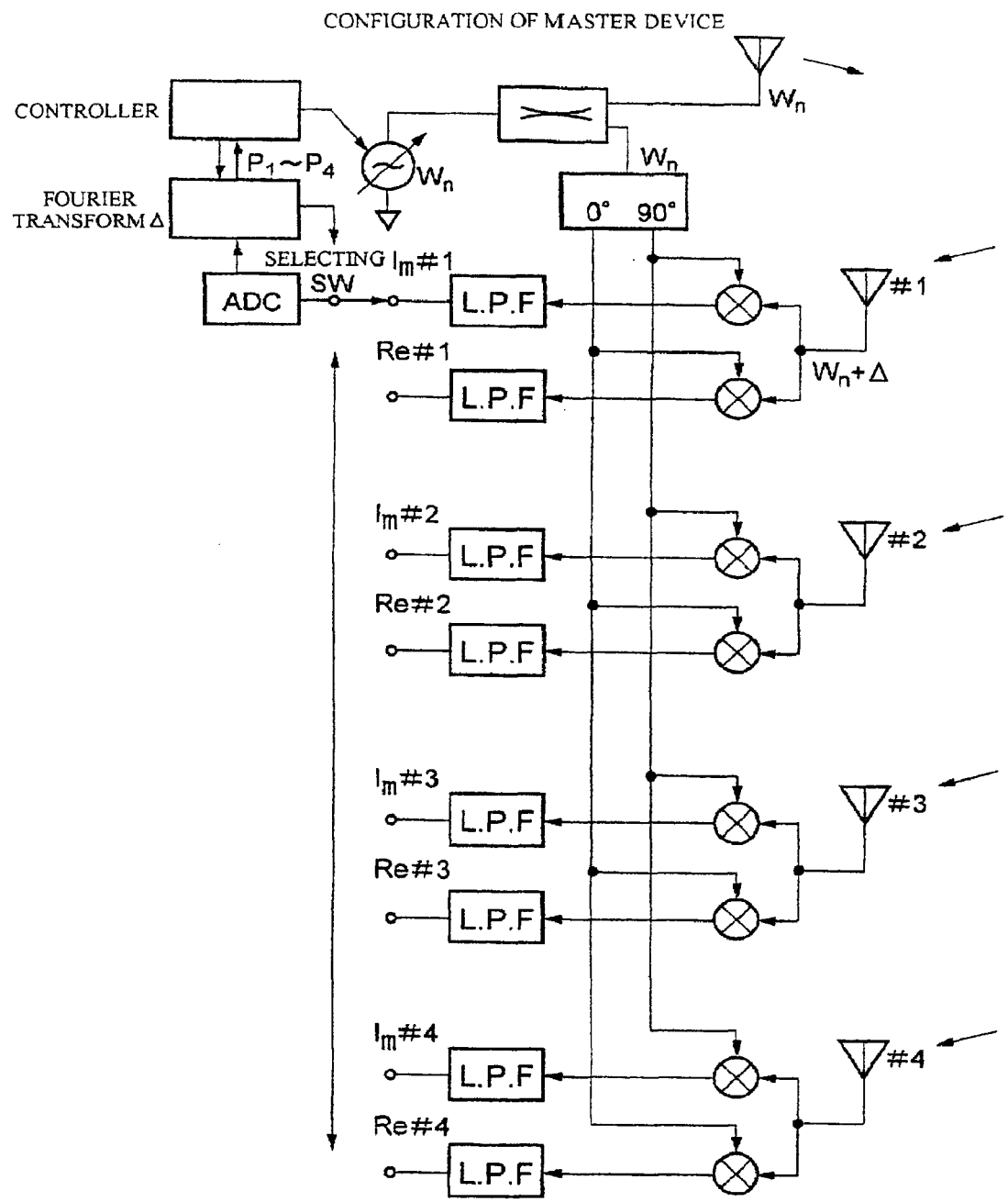
FIG. 7 is a diagram illustrating Example 3 of the present invention.

FIG. 7 illustrates the configuration of a master device. A Fourier transform section performs time-series Fourier integration on Re and Im data of antennas #1 through #4 to calculate a spectrum phase at a frequency Δ. In this case, it is assumed that phase differences due to each antenna cable and down converter and a time delay in operations of a selecting switch are calibrated for the compensation.

Note that FIGS. 29 to 31 present an example of an algorithm implemented in FORTRAN language for estimating three-dimensional locations of RFID tags in the configuration of FIG. 7, and FIG. 30 is an example of the program. Also, the analysis of RMS error in estimation of three-dimensional locations of the RFID tags in FIG. 23 is a result of computer simulation by the program of FIGS. 29 to 31 using the number of receiving antennas and error in distance measurement as parameters.

Note that in the program shown in FIGS. 29 to 31, the simulation for estimating the three-dimensional locations of the RFID tags is carried out in the following procedure.

(1) Assuming that radio wave frequencies output from interrogators are $f_1$=2.000 GHZ, $f_2$=2.025 GHZ and $f_0$=2($f_2$−$f_1$)=0.05 GHZ and $\lambda_0$=15 cm, the delay evaluation cycle length is taken as dlh=$\lambda_0/f_0$ (cm) and the number of receiving antennas is taken as na=16.

(2) The three-dimensional locations of the RFID tags are entered.

(3) Distances D are obtained based on phases at which response signals from the RFIDs are received by receiving antennas. In this case, spacing between the receiving antennas are taken as 50 cm.

$$D=\{Phase(f_2)-Phase(f_1)\}\times 3\times 10^{10}/\pi f_0 \text{ (cm)}$$

(4) Noise is added to the distances D obtained based on the phases of reception by the receiving antennas, and differences in distance to a reference antenna are calculated. Here, in common with all the distances D obtained at the above step (3), offsets such as distances $D_X$ from transmitting antennas of interrogators to the RFID tags and differences in response phase of the RFID tags are included, and therefore the reason why the differences to the reference antenna are calculated is to achieve the effect of eliminating influences of $D_x$ and so on.

(5) The differences in distance between the receiving antennas are compensated for the delay evaluation cycle length dlh.

(6) Three-dimensional locations $X_P$, $Y_P$, $Z_P$ of the RFID tags are assumed.

(7) Distances to the assumed tag locations $X_P$, $Y_P$, $Z_P$ are obtained based on the phases of reception by the receiving antennas.

(8) The differences in distance between the antennas, which are actually received at the above step (5), are compared with differences between the distances to the assumed tag locations that are obtained at the above step (7) based on the phases of reception by the receiving antennas.

(9) The distance differences compared above are compensated for the delay evaluation cycle length dlh.

(10) Error energies are obtained with respect to the compared distance differences between the receiving antennas that have been subjected to the above cycle compensation.

(11) After repeating the processes of the above steps (6) through (10), three-dimensional locations of five positions of the tag are listed in ascending order of error energy.

(12) Approximate results for estimating the three-dimensional locations of the listed five positions of the tag and the error RMS values are displayed.

(13) An assumed tag location that provides a minimum error energy is obtained in three dimensions by repeating the above processes in (6) through (10) with more fragmented steps focusing on each of the three-dimensional locations of the listed five positions of the tag.

(14) The three-dimensional assumed tag location that provides the minimum error energy is displayed as a finally estimated RFID tag location.

Example 4

A Method for Longer-Range Communication with RFID Tags

The RFID tag of the present invention, even by itself, can perform communication within a relatively long range of about 10 m. However, if it is used for a sign on an expressway and so on, the communication range of about 10 m is highly unlikely to be sufficient. Accordingly, RFID tags of the present invention are arranged in an array to add a phase difference to a response signal from each tag, so that the response signal can be returned with high sensitivity to interrogators in a wide area, thereby making it possible to perform communication within a range of about 100 m. An example thereof is shown in FIGS. 24 through 28.

Figure 8:
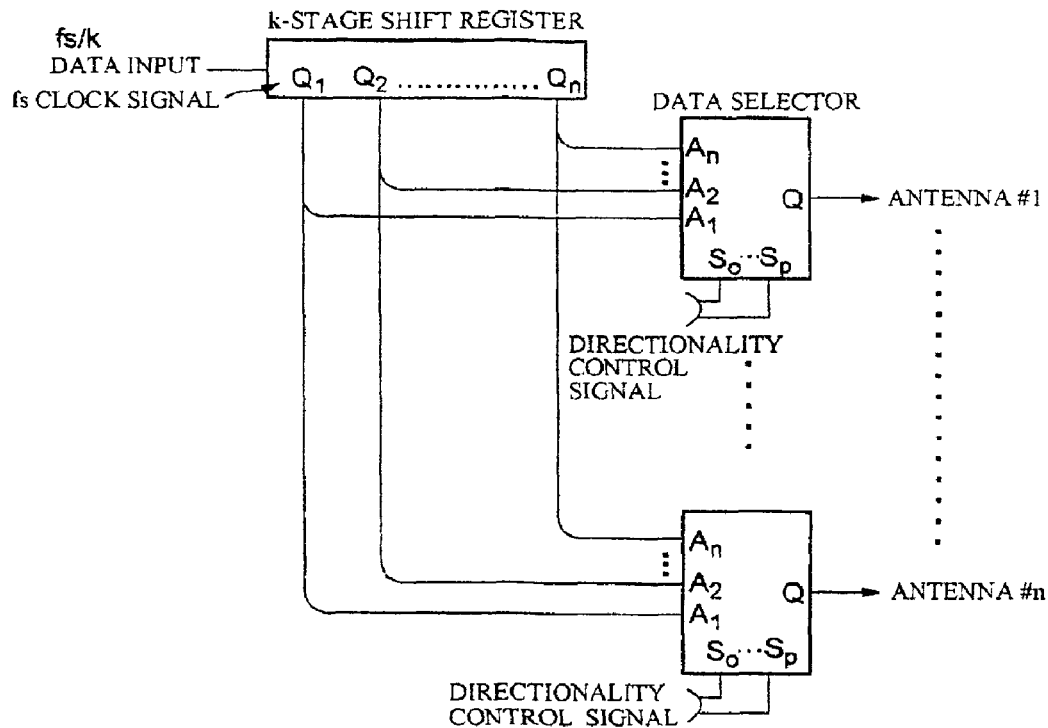
FIG. 8 is a diagram illustrating Example 4 of the present invention.

The method described herein controls directionality by the arrangement of the RFID tags and combinations of response signal phases at 0°/180° for each tag; however, it is also possible to more strictly control the directionality by assigning more fragmented phase differences as shown in FIG. 8.

Figure 9:
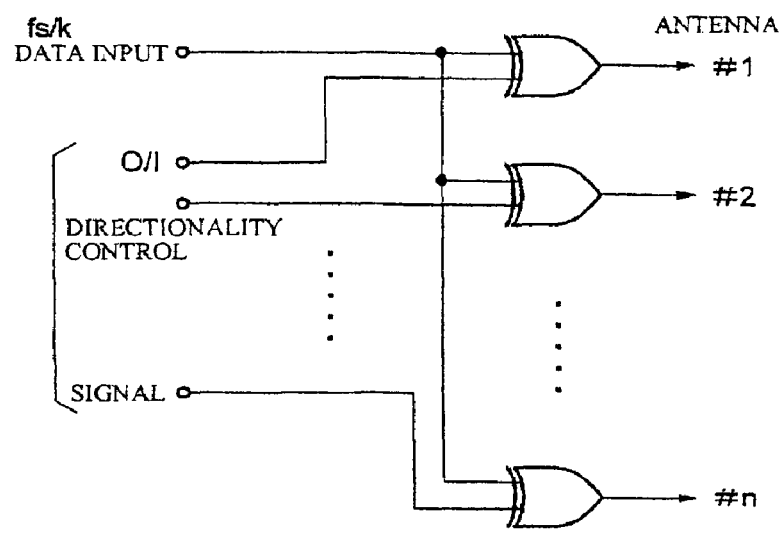
FIG. 9 is a diagram illustrating Example 4 of the present invention.

Note that the combinations of phases at 0°/180° in FIG. 24 through 28 can be readily realized by using an $E_XOR$ as shown in FIG. 9.

Also, it is made possible to communicate with interrogators in a wide area by periodically changing the combinations of phases provided herein to perform scanning with a beam of intense response radio waves that can be returned only within a narrow area.

INDUSTRIAL APPLICABILITY

Common features of being inexpensive, having no power supply, requiring no maintenance and being capable of long range communication (up to about 100 m) are used as the means of implementation.

(1) Because of the ease of attachment to a road sign, etc., and the fact that information can be read by an interrogator from relatively afar and, if radio wave diffraction is utilized, even from a position behind another vehicle, it is possible to construct an intelligent navigation system notifying information concerning the speed limit, indication of a curve/fork, etc., to the driver and an automatic operation or safety support device of the vehicle.

(2) Because of the ease of attachment to an advertisement material such as a poster and the fact that information can be read by an interrogator from relatively afar, it is possible to realize an applied device for reading an Internet home page address on a posted advertisement from a distance and construct a product advertising system. In this case, it is conceivable to simultaneously read a plurality of posters having the same address or simultaneously read a plurality of posters having a different address. A reader (an interrogator) owned by the user incorporates, as a part of ID, a code that represents a color corresponding to visual information of a poster or attached tag or a relatively simple symbol/mark to facilitate selection of an Internet link, avoid displaying identical addresses and present displays in order of address hierarchy.

(3) Because of the ease of attachment to a sample or product such as an exhibit and the fact that information can be read from relatively afar, it is possible to construct a reservation and market research system that, without necessitating approaching the exhibit, transmits a product reservation and information added with preferences regarding the size and color to the seller of the product (a reader is additionally provided with a wireless LAN function or a cell phone function, or the reader accumulates information and returns it to the seller). In this case, it is conceivable to simultaneously read information concerning a plurality of products having the same ID from a display shelf or a showcase or simultaneously read a plurality of pieces of information concerning products having a different ID. The reader owned by the user incorporates, as a part of ID, a code that represents a color corresponding to visual information of a product or attached tag or a relatively simple symbol/mark to facilitate selection of a preferred product, avoid displaying identical ID codes or symbols and provide displays in order of ID code hierarchy.

(4) Because of easy incorporation into cars, home appliances, etc., and the feasibility of being read from relatively afar, it is possible to construct a system for performing classification for recycling or deterring illegal waste dumping, stealing for resale, etc. Specifically, by recording, together with an ID code, not only information at the time of production but also information concerning the owner or information concerning the presence or absence of hazardous substances, it is made possible to allow a relatively simple reader to perform concurrent identification from afar.

(5) According to the RFID tag device of the present invention, not only information recorded in a memory but also information regarding a selected voting switch or the like can be returned as a response signal and readily read from relatively afar, and therefore it is possible to construct an instant voting/ballot counting system at an event site or the like. The RFID tag of the present invention has no power supply and a thin and relatively simple structure, and therefore the cost for mass production is conceivably about several tens of yen. Accordingly, it can be left uncollected after used as an invitation or ticket for an event, or it can be collected and repeatedly used.

(6) According to the RFID tag of the present invention, not only information recorded in a memory but also information measured by various transducers can be returned as a response signal and read from relatively afar, and therefore it is possible to construct a system that uses a relatively small number of interrogators to continuously monitor physical condition information such as an ill-conditioned person's heartbeat from afar without imposing a burden on that person.

(7) According to the RFID tag of the present invention, not only information recorded in a memory but also information measured by various transducers can be returned as a response signal and read from relatively afar, and therefore it is possible to construct a system that continuously monitors a device, such as high-voltage power transmission and distribution equipment, which is difficult to connect to a sensor and cannot be readily suspended for maintenance because it is dangerous to gain access thereto.

Figure 2:
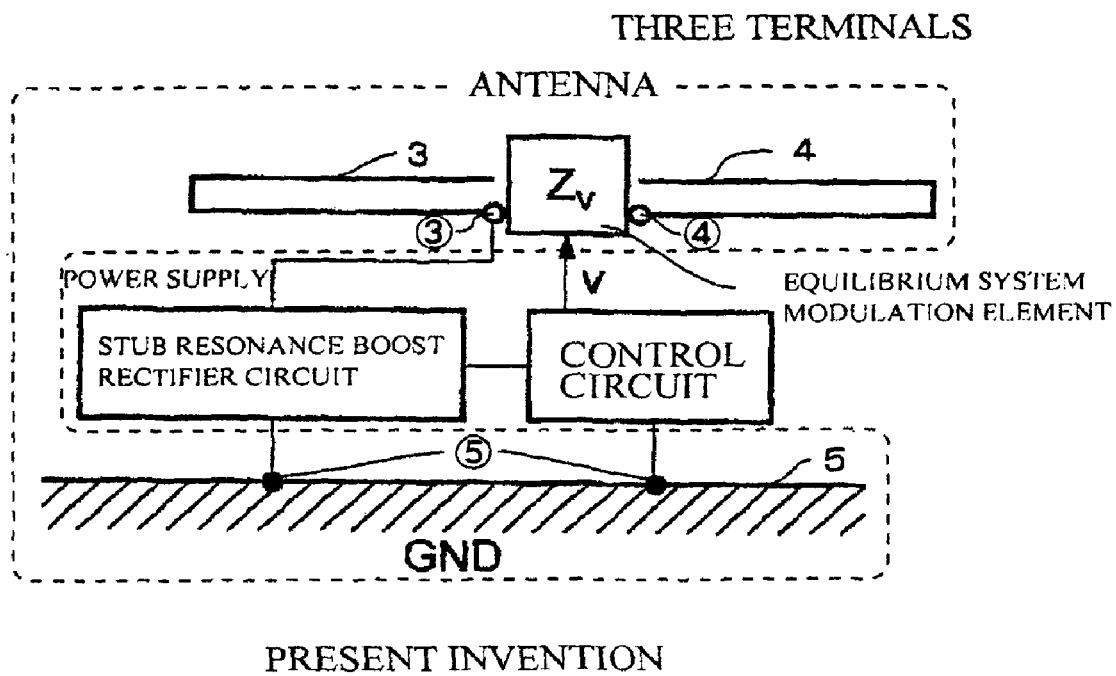
FIG. 2 is a schematic diagram illustrating an RFID tag device of the present invention.

(8) In the example of FIG. 4, the stub resonance boost rectifier circuit and the control circuit in FIG. 2 illustrating the configuration of the RFID tag device of the present invention are integrated as a control circuit chip. However, a highly-versatile, low power consumption microprocessor (e.g., PIC16F684 manufactured by Microchip Technology Inc.) can be used as the control circuit and combined with the stub resonance boost rectifier circuit. By configuring as such, it is made possible to input analog data or digital data, so that such data can be temporarily stored in the RFID tag or can be stored in an EEPROM for a long period of time. Further, it can be used for remote control reception with a home appliance or the like, but also it is possible to read a variety of types of information with no power being supplied. For example, with a reader (a remote controller), it is possible to check information such as:

Power is not being supplied;
xxx is out of order;
yyy is still inside xxx;
yyy is reserved for xxx;
yyy was last used on x month, x day at x o'clock, x minutes.

(9) The RFID tag device of the present invention can be operated to the same standard as a 2.45 GHz wireless LAN, and therefore it is possible to use, as an interrogator, a wireless LAN base station or a wireless LAN terminal. In this case, a 2.45 GHz carrier signal needs to be transmitted from the wireless LAN to provide operating power for the RFID tag device, but it may be a radio wave of an FHSS or OFDM scheme, which is a wireless LAN standard. The RFID tag device returns reply information on a subcarrier signal offset by an oscillating frequency of a local transmitter in the tag, and therefore the reply information from the RFID tag can be read at the wireless LAN by demodulating a subcarrier signal synchronously detected with a transmission carrier.

The invention claimed is:

1. An RFID tag device comprising:
a divided microstrip antenna having three-terminal structure in which a receiving terminal and a replying terminal are divided, the microstrip antenna comprised of a GND board and a strip conductor to divide the strip conductor in the direction of the length;
a power receiving circuit based on a combination of a stub resonance-based impedance transformation RF boosting scheme which resonates a $N\lambda g/4$ short stab (N is an odd integer) and a capacitance in series, and a ladder boosting/rectifying scheme which eliminates input grounded diode in order to operate boosting and rectifying in a condition of DC short by a stab of a Cockcroft-Walton circuit; and
a local oscillator circuit for generating a response subcarrier signal from the tag.

2. The RFID tag device according to claim 1, wherein a dividing position of the divided microstrip antenna is slightly deviated from a longitudinal center point across strip conductors by 5% to 30% with respect to the entire length.

3. The RFID tag device according to claim 1, wherein a passive QPSK modulation method is used for the modulation of the response subcarrier signal from the tag.

4. The RFID tag device according to claim 1, wherein impedance modulation elements of the divided microstrip antenna are respectively connected to opposite ends in a strip conductor width direction so as to connect divided conductors.

5. The RFID tag device according to claim 4, wherein the impedance modulation elements are PIN diodes or varactor diodes.

6. The RFID tag device according to claim 5, wherein the impedance modulation elements constitute a voltage or current controlled three-terminal element using a transistor, rather than a diode.

7. The RFID tag device according to claim 1, wherein a capacitance which is obtained from a capacitance of 1 pF to 0.1 pF being divided by the using frequency per GHz unit is used for connecting the power receiving circuit and an antenna feeding point to perform high-impedance capacitive feeding.

8. The RFID tag device according to claim 1, wherein capacitive load impedances in a stub resonator and a ladder boost rectifier circuit of the power receiving circuit are parallel resonant, and further, the capacitive feeding impedance are series resonant.

9. The RFID tag device according to claim 1, wherein when considering longitudinal connections of capacitors in the ladder boost rectifier circuit of the power receiving circuit as GND- and receiving-side rails, capacitor capacitance of the receiving-side rail is smaller by one digit than that of the GND-side rail, a first diode between GND and a receiving point is eliminated, and a high-frequency and high-impedance input is receivable by a DC short.

10. The RFID tag device according to claim 3, wherein a logic circuit including a ¼ frequency divider, a shift register and a data selector is used in the passive QPSK modulation method.

11. The RFID tag device according to claim 10, wherein MPSK modulation is applied by using a 1/M frequency divider, an M-stage shift register and an M-input data selector.

12. The RFID tag device according to claim 3, wherein response information including a tag ID code, etc, is recorded to a memory in units of two bits in accordance with the passive QPSK modulation method.

13. The RFID tag device according to claim 3, including an output timing generator circuit for obtaining an output enable signal in the passive QPSK modulation method.

14. The RFID tag device according to claim 13, wherein the output timing generator circuit generates a train of pulses with a random delay time having a fixed width and a fixed frame cycle, based on a source voltage size and a clock signal.

15. The RFID tag device according to claim 1, wherein by using a transducer such as a temperature sensor quartz resonator as the local oscillator circuit for generating the response subcarrier signal, a sensor function capable of allowing its oscillating frequency to be read by an external unit is additionally used.

16. A position detecting method, wherein in a system composed of an RFID device as claimed in claim 1, one or more master devices (interrogators), determining a presence of an obstacle in a radio wave propagation path extending between each RFID tag device and each interrogator based on the presence or absence of communication between the RFID tag and the interrogator.

17. The position detecting method according to claim 16, wherein a plurality of radio wave propagation paths present between each RFID tag and each interrogator are distinguished based on a combination of a local oscillating frequency for generating a response subcarrier of each RFID tag, a response timing, a frequency of an interrogation radio wave outputted from the interrogator and timing of generating the interrogation radio wave.

18. A position detecting method for a mobile object having an RFID tag, wherein interrogation radio waves at two or more frequencies are transmitted to an RFID tag device as claimed in claim 1 from an interrogator having two or more antennas dedicated for reception or used for transmission and reception, and based on a difference in phase between receiving antennas in a response subcarrier signal thereto, maximum likelihood determination of a position of the RFID tag is performed.

19. The position detecting method for a mobile object having an RFID tag according to claim 18, wherein in order to enable a three-dimensional RFID tag position determination, an interrogation having four or more antennas dedicated for reception or used for transmission and reception is used to eliminate a commonly measured distance offset by obtaining a group delay time in each radio wave propagation path based on four or more sets of response subcarrier signals measured for the two or more interrogation carrier radio waves, and obtaining a difference in delay time with reference to at least one of the sets.

20. The RFID tag device according to claim 1, wherein in order to expand communication range two or more divided microstrip tag antennas of the tag are included, and the response subcarrier signals are synthesized.

21. A communication method, wherein an RFID tag device as claimed in claim 20, wherein an RFID tag device as claimed in claim 20 utilizes synthesized directionality of antenna arranged in an array, and periodically changes wave direction of an intense response subcarrier radio wave, which is synthesized by periodically changing a phase of a local oscillating signal provided to each antenna arranged in array for generating a response subcarrier signal, thereby returning an intense response radio wave toward an interrogator in a wide area.

* * * * *